United States Patent [19]
Matsuda

[11] 4,035,899
[45] July 19, 1977

[54] AUTOMATIC TAPE CASSETTE-ASSEMBLING SYSTEM

[75] Inventor: Hironobu Matsuda, Machida, Japan

[73] Assignee: Olympus Optical Co., Ltd., Tokyo, Japan

[21] Appl. No.: 665,166

[22] Filed: Mar. 9, 1976

[30] Foreign Application Priority Data

| | | |
|---|---|---|
| Mar. 10, 1975 | Japan | 50-28822 |
| May 16, 1975 | Japan | 50-65322 |
| May 31, 1975 | Japan | 50-73380 |
| June 2, 1975 | Japan | 50-74653 |
| June 6, 1975 | Japan | 50-76475 |
| June 6, 1975 | Japan | 50-76476 |

[51] Int. Cl.² .......................................... B23P 19/04
[52] U.S. Cl. .................................. 29/773; 29/169.5; 29/806; 29/809; 53/118
[58] Field of Search ............ 29/208 R, 211 R, 200 R, 29/169.5, 430, 469, 200 J, 200 A; 53/118, 119

[56] References Cited

U.S. PATENT DOCUMENTS

| | | | |
|---|---|---|---|
| 3,226,816 | 1/1966 | Wilson et al. | 53/118 |
| 3,457,627 | 7/1969 | Napor et al. | 53/118 |

*Primary Examiner*—Victor A. DiPalma

[57] ABSTRACT

A system for automatically assembling a tape cassette including upper and lower cassette housing halves, a pair of reel hubs received in said housing halves and a magnetic tape wound about both reel hubs, which comprises a magnetic tape-loading mechanism for winding a magnetic tape about the reel hubs and loading the reel hubs and magnetic tape into the lower housing half placed on an assembly line, wherein the magnetic tape-loading mechanism comprises a reel hub-fitting device for fitting each of the paired reel hubs on a tape takeup jig; a tape takeup device for winding a magnetic tape about the reel hubs; and a tape transfer device for holding the reel hubs fitted on the tape takeup jigs and a magnetic tape in the same arrangement as actually takes place in the tape cassette and thereafter loading both reel hubs and magnetic tape into the lower housing half.

30 Claims, 92 Drawing Figures

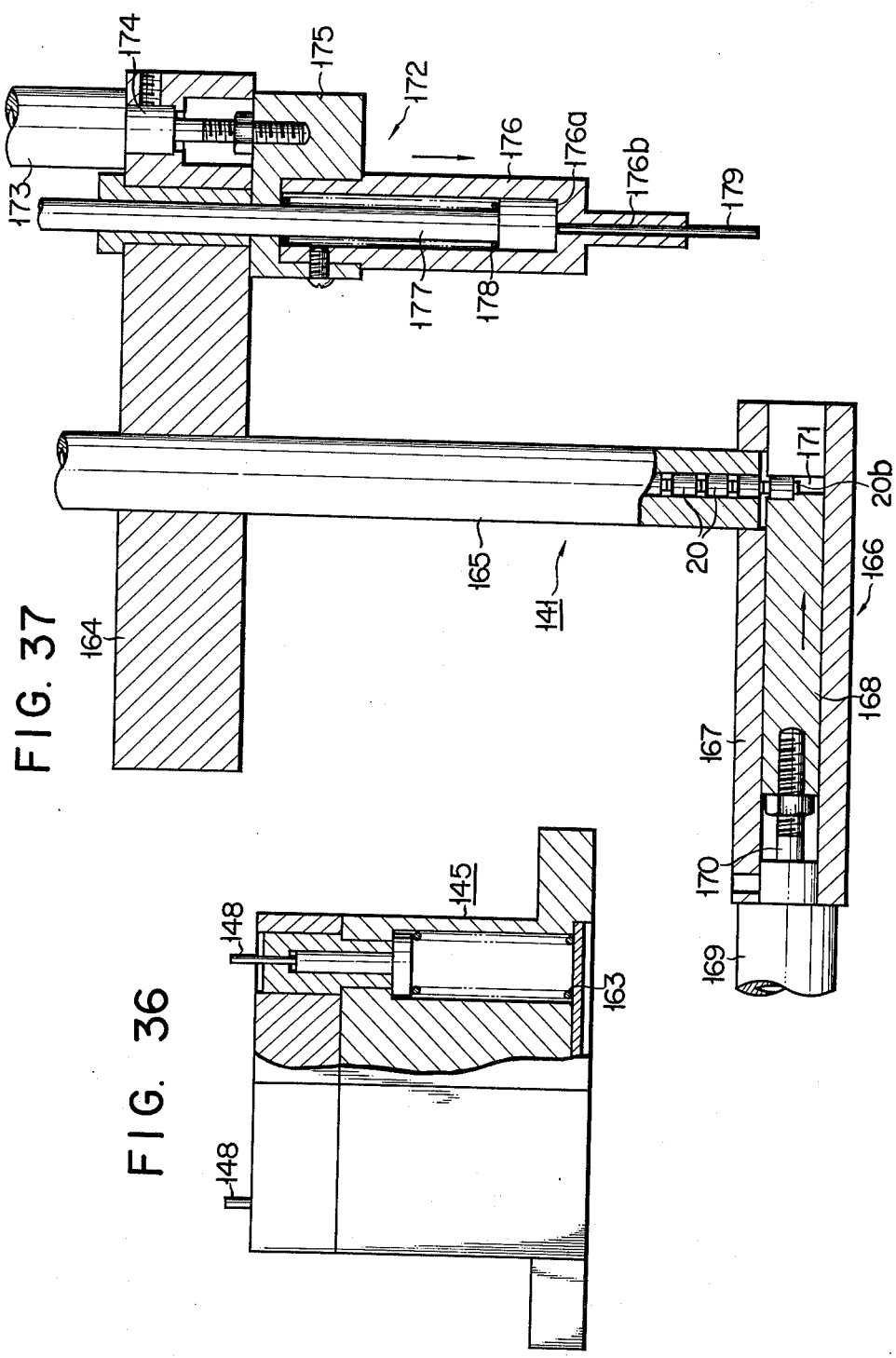

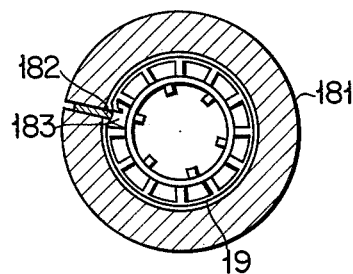
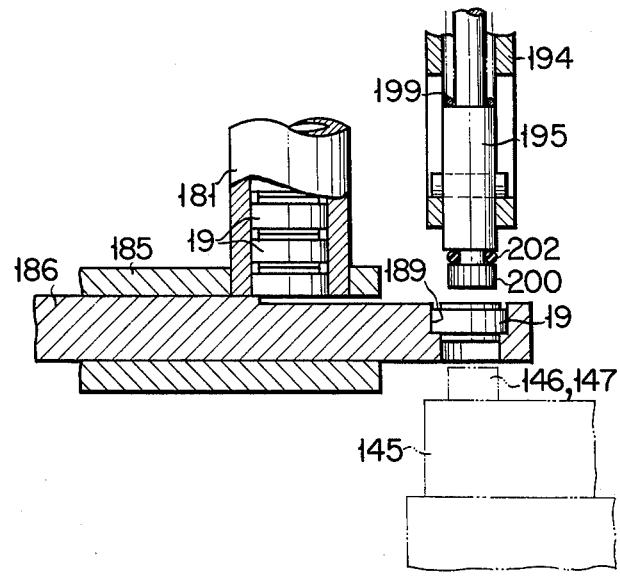
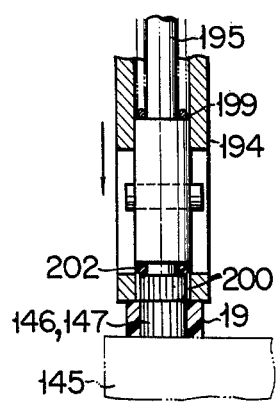
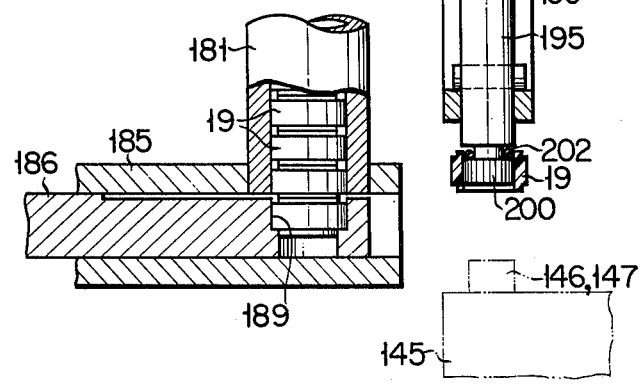

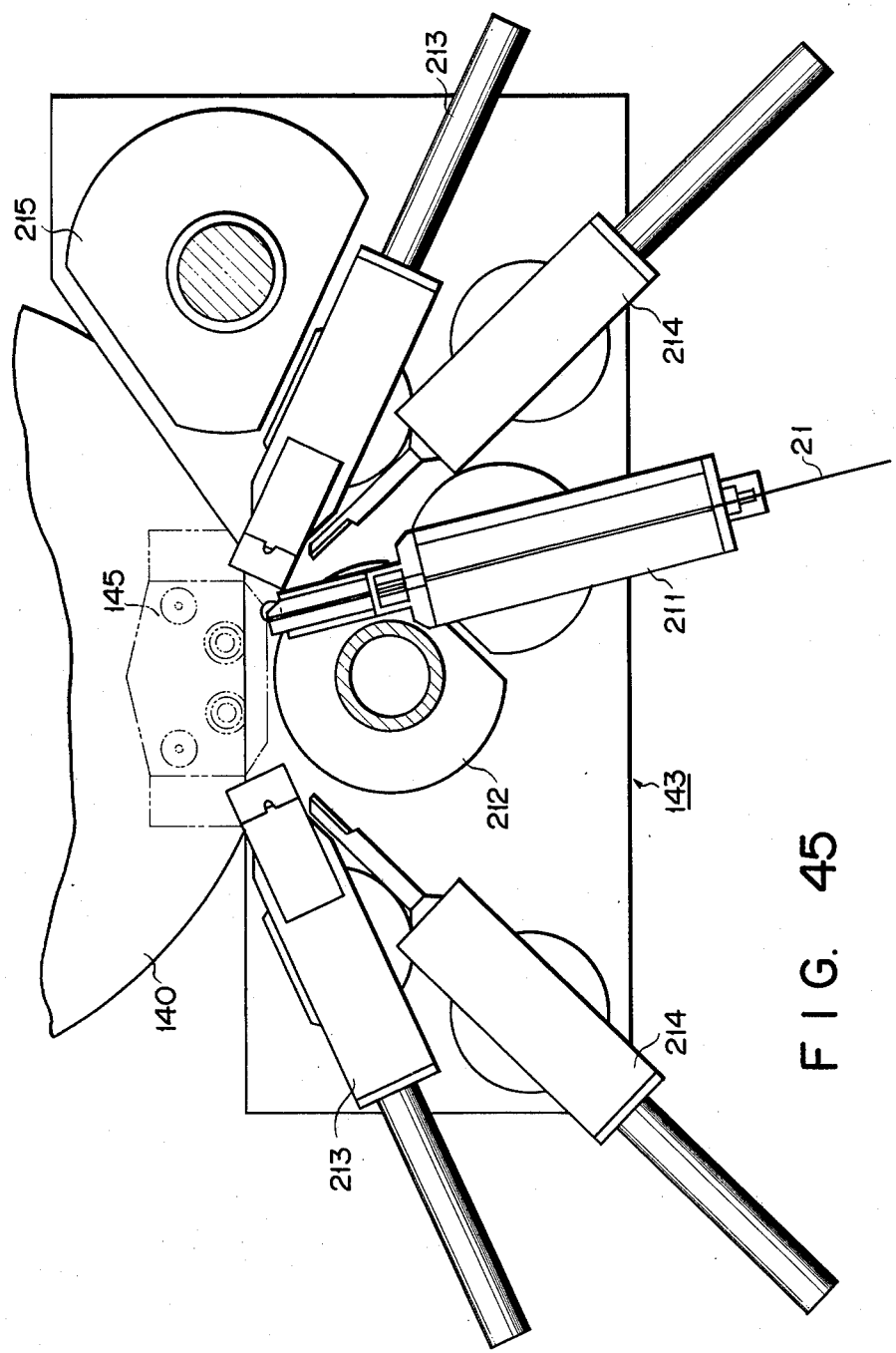
F I G. 45

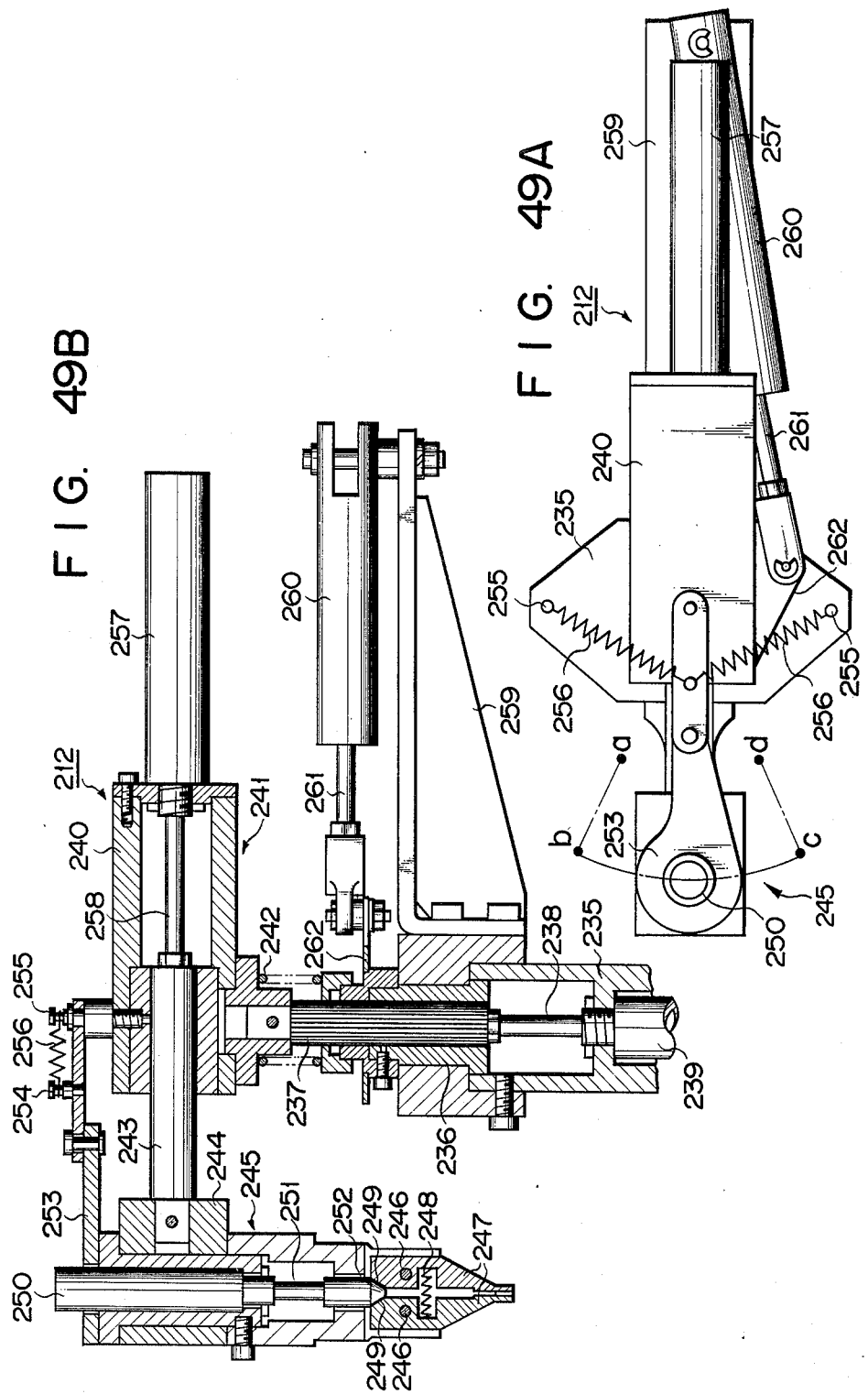

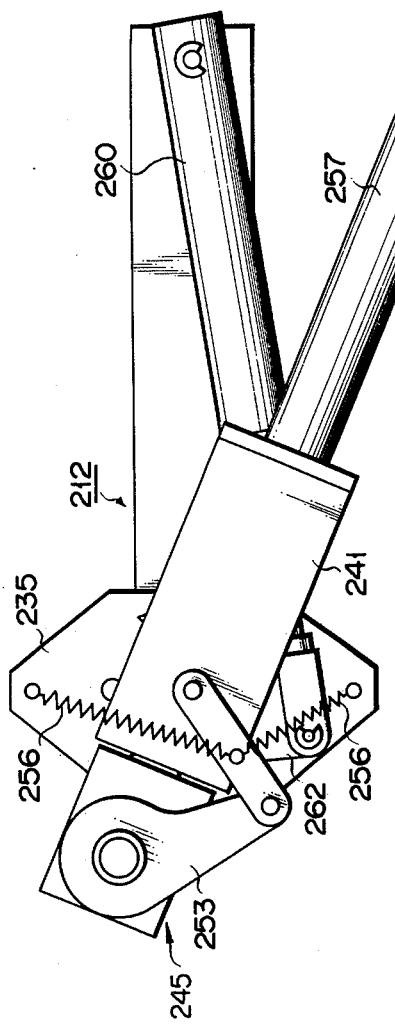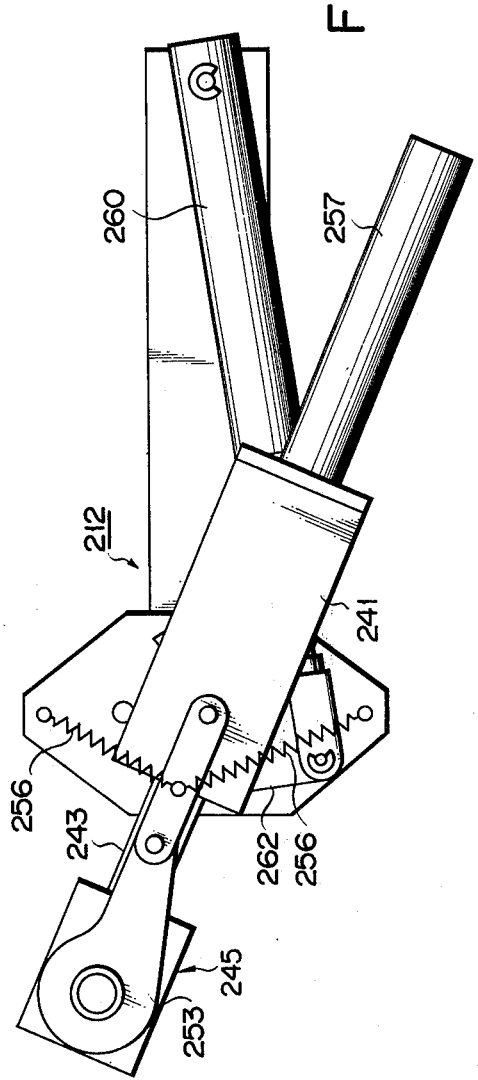

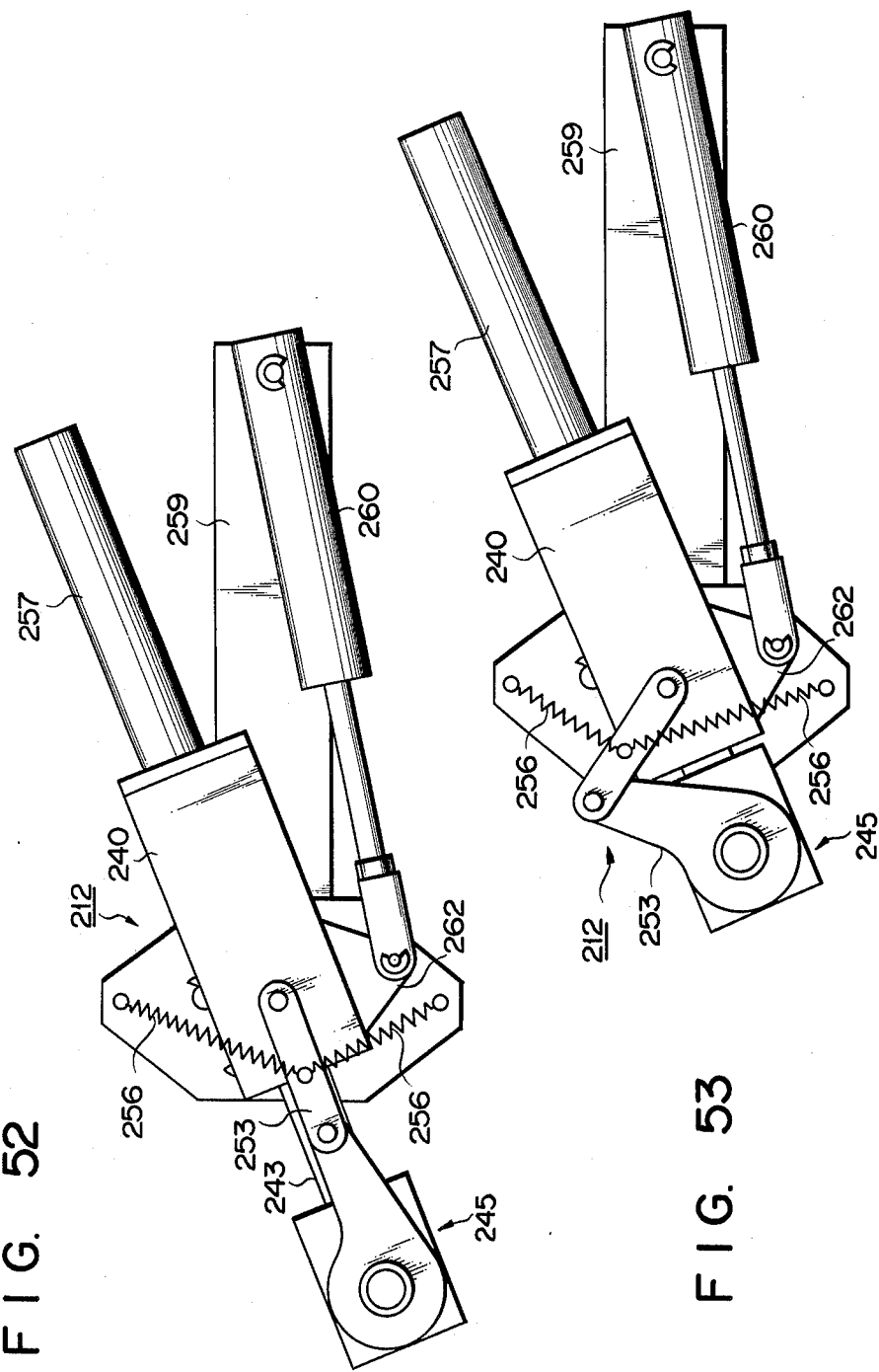

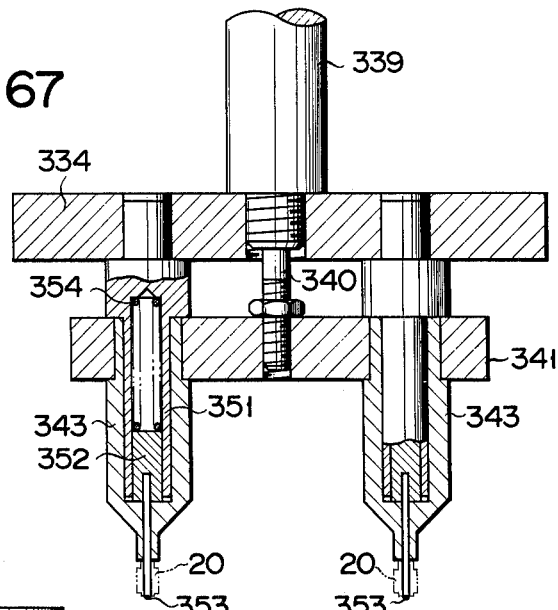
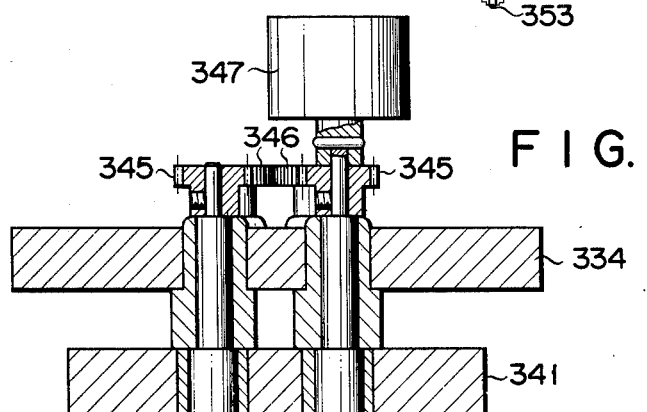
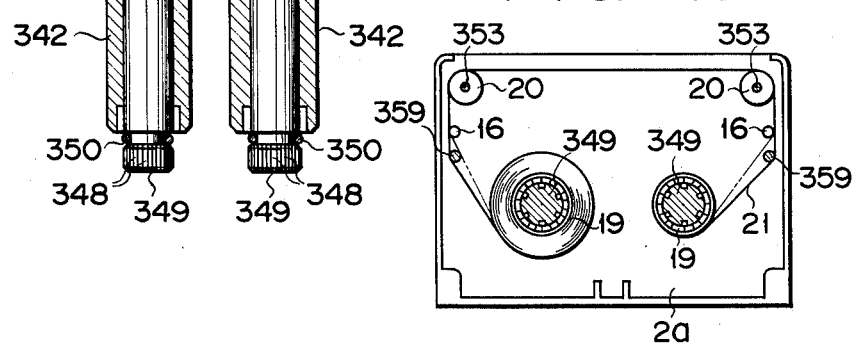

FIG. 82
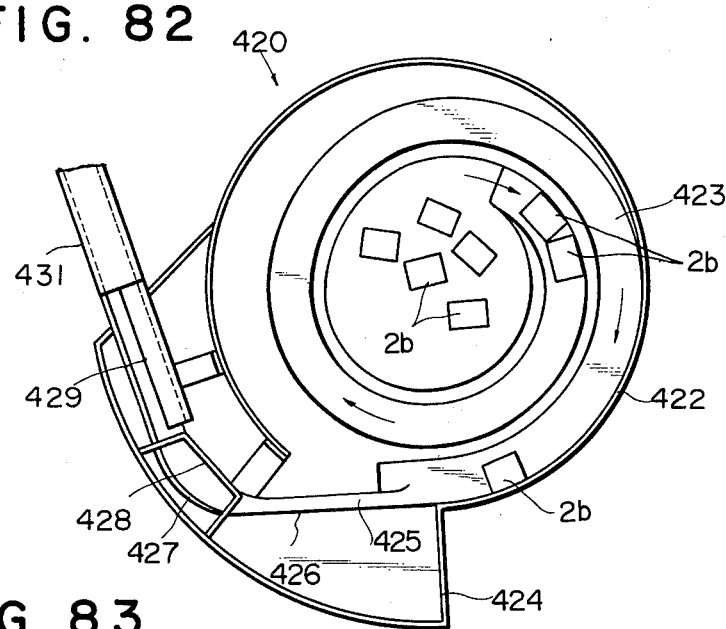
FIG. 83
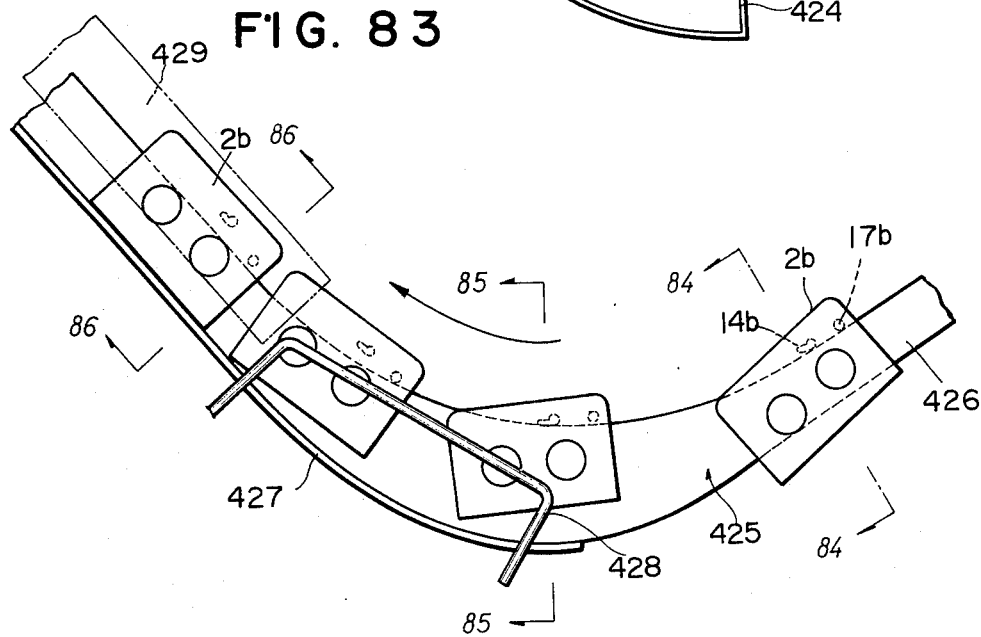
FIG. 84     FIG. 85     FIG. 86
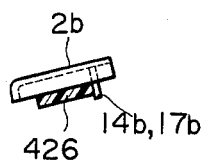 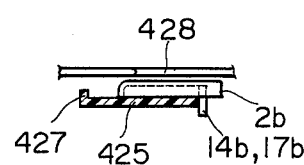 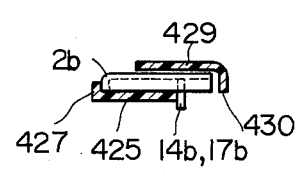

AUTOMATIC TAPE CASSETTE-ASSEMBLING SYSTEM

BACKGROUND OF THE INVENTION

This invention relates to a system for automatically assembling a tape cassette having a pair of reel hubs received in a cassette housing formed of a pair of upper and lower cassette housing halves and a magnetic tape stretched across both reel hubs.

Where the above-mentioned type of tape cassette is automatically assembled, customary practice is to insert first a linear sheet and then a pair of reel hubs and a pair of guide rollers into one upturned cassette housing half, stretch a magnetic tape across the paired reel hubs, fit a pad spring and another liner sheet into said upturned housing half, put the other cassette housing half on said upturned housing half, and finally fix both cassette housing halves together by proper means, for example, screws.

Where, with the above-mentioned assembling process, an attempt is made to stretch a magnetic tape across the reel hubs, the upright peripheral walls of the lower cassette housing half hinders this stretching operation, presenting great difficulties in effecting the fully automatic assembly of a tape cassette. To date, therefore, a magnetic tape previously wounded about the reel hubs has been manually loaded into a cassette housing half placed on an assembly line, consuming a great deal of time and requiring a considerable number of workers in constructing a tape cassette.

SUMMARY OF THE INVENTION

It is accordingly the object of this invention to provide an automatic tape cassette-assembling system capable of effecting the quick and inexpensive assembly of a tape cassette by automating the various steps of constructing a tape cassette, particularly, the step of loading a magnetic tape into one of the cassette housing halves.

BRIEF DESCRIPTION OF THE DRAWING

FIG. 13 is a plan view of said stop mechanism; FIG. 14 is a fractional sectional view thereof; and FIG. 15 is a longitudinal sectional view on line 15—15 of FIG. 14;

FIG. 16 is a fractional cross sectional view thereof; FIG. 17 is a fractional sectional view thereof; and FIG. 18 is a fractional longitudinal view thereof as viewed from the right side of FIG. 16;

FIGS. 35, 36 are cross sectional views on lines 35—35 and 36—36 of FIG. 34;

FIG. 37 is a longitudinal sectional view of a guide roller-fitting device of the magnetic tape-loading mechanism;

FIG. 41 is a cross sectional view on line 41—41 of FIG. 40;

FIG. 42 is a longitudinal sectional view of the reel hub-fitting device, showing the condition in which the reel hub-pushing arm extends right below a reel hub holder;

FIG. 43 is a longitudinal sectional view of the reel hub-fitting device, showing the condition in which the reel hub holder has supported the reel hub;

FIG. 44 is a longitudinal sectional view of the reel hub-fitting device, showing the condition in which the reel hub is fitted into the tape takeup jig;

FIG. 45 is a plan view of the magnetic tape takeup device of the magnetic tape-loading mechanism;

FIGS. 49A, 49B are respectively a plan view and longitudinal sectional view of a magnetic tape-conducting means of the magnetic tape takeup device;

FIGS. 50 to 53 are plan views, showing the sequential operating steps of the magnetic tape-conducting means;

FIGS. 67, 68 are cross sectional views of the magnetic tape-transferring means on lines 67—67 and 68—68;

FIG. 69 is a plan view showing the relative positions of the magnetic tape held by the magnetic tape-transferring means and the lower cassette housing half;

FIG. 82 is a plan view of an upper cassette housing half-sorting means of the upper cassette housing half feeder;

FIG. 83 is a partly enlarged plan view of the upper cassette housing half-sorting means of FIG. 82; and FIGS. 84 to 86 are cross sectional views on lines 84—84, 85—85 and 86—86 of FIG. 83.

DETAILED DESCRIPTION OF THE EMBODIMENTS

Figure 1:
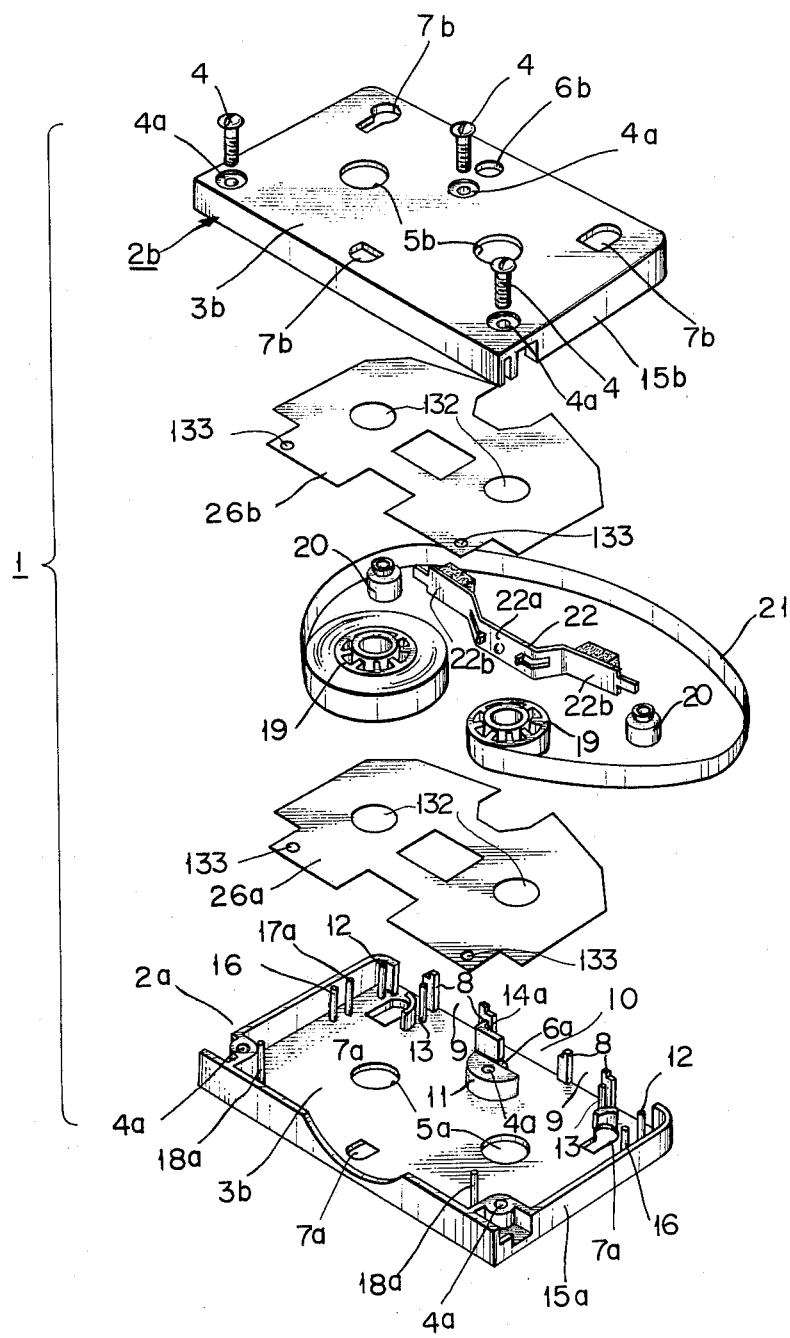
FIG. 1 is an oblique view of a dismembered tape cassette.
Figure 2:
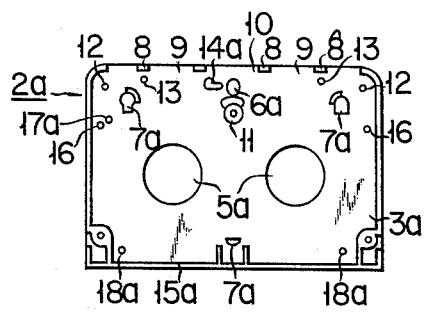
FIGS. 2 and 3 are plan views of lower and upper cassette housing halves.
Figure 3:
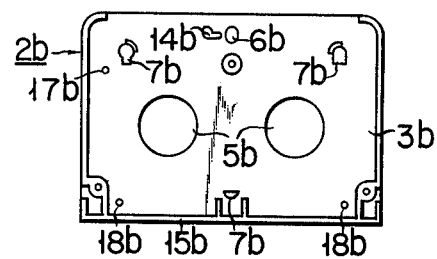
Figure 4:
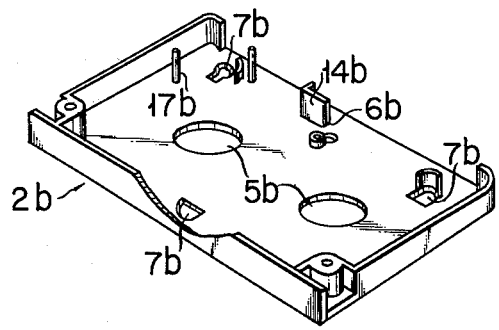
FIG. 4 is an oblique view of an upturned upper cassette housing half.
Figure 5:
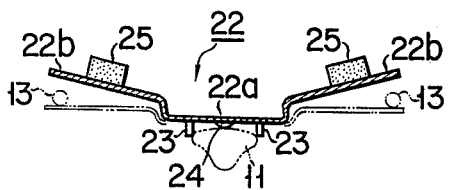
FIG. 5 is a cross sectional view of a pad spring.

FIGS. 1 to 5 show a tape cassette 1 constructed by the automatic assembling system of this invention. The indicated tape cassette is, for example, 50 mm wide, 33 mm long and 8 mm thick. However, a tape cassette constructed by the assembling system of the invention need not be restrictively chosen to have the above-mentioned dimensions. This invention is also applicable to the construction of another co-planar type tape cassette.

There will now be described a tape cassette with that side of said cassette at which it is inserted into a tape recorder hereinafter referred to as an "forward portion". The tape cassette 1 comprises a cassette housing formed of a pair of cassette housing halves 2a, 2b made of transparent plastics material. Both halves are fixed together by screws 4 threadedly inserted into screw holes 4a. Each cassette housing half is opened at the forward side and provided with an upright wall 15a, 15b on both crosswise side edges and rear side edge. The bottom walls 3a, 3b of both cassette housing halves 2a, 2b are bored with a total of two pairs 5a, 5b of reel hub-supporting holes which are symmetrically disposed to each other as well as across both bottom walls 3a, 3b, also with capstan-inserting holes 6a, 6b at the respective forward center, and further with locating holes 7a, 7b formed at the right and left sides and rear center.

The lower cassette housing half 2a has a plurality of tape guide projections 8 provided on the forward edge, a pair of magnetic head inlets 9 formed between two right side tape guide projections 8 as well as between two left side tape guide projections 8 and a pinch roller inlet 10 disposed between the central mutually facing tape guide projections 8.

Projectively provided on the bottom wall 3a of the lower cassette housing half 2a are a spring seat 11 positioned immediately behind the capstan-inserting hole 6a, a pair of roller shafts 12 set at both forward corners, a pair of tape guide pins 13 formed near the extreme right and left tape guide projections 8 and a tape guide pin 14a located near the left side of the pinch roller inlet 10. A pair of tape guide pins 16 are each set symmetrically in a horizontal direction at a point spaced from the forward edge of the lower cassette housing half to an extent of about one-fourth of the longitudinal width thereof. Another tape guide pin 17a is provided near the inner side of the left tape guide pin 16. A pair of locating pins 18a are symmetrically arranged at the rear right and left corners of the bottom wall 3a of the lower cassette housing half 2a.

The tape guide pins 13, 14a, 16, 17a, locating pins 18a and tape guide projections 8 have their top ends positioned sufficiently higher than the surface of the upright peripheral walls 15a to reach the bottom wall 3b of the upper cassette housing half 2b when both cassette housing halves 2a, 2b are joined together. Like the lower cassette housing half 2a, the upper cassette housing half 2b has its forward side opened and both side edges and rear edge provided with upright walls 15b. Projectively formed on the bottom wall 3b of the upper cassette housing half 2b are tape guide pins 14b, 17b to occupy a symmetrical position relative to the tape guide pins 14a, 17a of the lower cassette housing half 2a.

A pair of recesses 18b are formed near the right and left corners of the bottom wall 3b of the upper cassette housing half 2b for engagement with the tip of the locating pins 18a. The top ends of the tape guide pins 14b, 17b are disposed higher than the surface of the peripheral walls 15b of the upper cassette housing half 2b.

Figure 6:
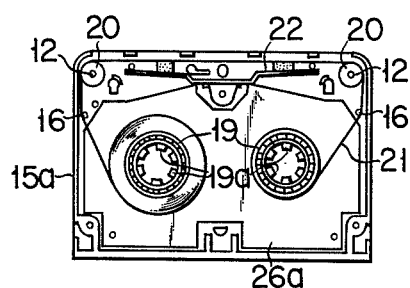
FIG. 6 is a plan view of reel hubs, magnetic tape, guide rollers and pad spring arranged in the lower cassette housing half.

A pair of reel hubs 19 are rotatably fitted into the reel hub supporting holes 5a, 5b bored in the bottom walls 3a, 3b of both cassette housing halves 2a, 2b. The inner peripheral wall of the reel hub is provided with a plurality of cylindrical engagement projections 19a (FIG. 6), which convergently extent in a radial direction. A pair of guide rollers 20 are rotatably supported on the paired roller shafts 12. One reel hub 19 is wound with a magnetic tape 21. As shown in FIG. 6, the magnetic tape 21 first passes over one tape guide pin 16 and one tape guide roller 20 and then is guided to the other tape guide roller 20 and the other tape guide pin 16 and finally wound about the other reel hub 19. A pad spring 22 (FIG. 5) consisting of a leaf spring comprises a central portion 22a bent in the U-shape and a pair of spring arms 22b extending obliquely from said central portion 22a. A pair of engagement projections 23 and one fulcrum projection 24 extend from the U-shaped central portion 22a. The pad spring 22 is normally kept in a solid line position shown in FIG. 5. Where, however, the pad spring 22 is inserted into the lower cassette housing half 2a, the U-shaped central portion 22a abuts against the spring seat projection 11, and the tips of the paired spring arms 22b are elastically pressed against the paired tape guide pins 13, occupying a chain line position shown in FIG. 5. At this time, paired pads 25 fixed to the spring arms 22b face the head inlets 9.

Thin slippery liner sheets 26a, 26b are provided between the magnetic tape 21 and the bottom walls 3a, 3b of the lower and upper cassette housing halves 2a, 2b. The liner sheets 26a, 26b are each provided with a pair of locating holes 132 corresponding to the paired reel hubs 19 and a pair of openings 133 corresponding to the paired locating pins 18.

Figure 7:
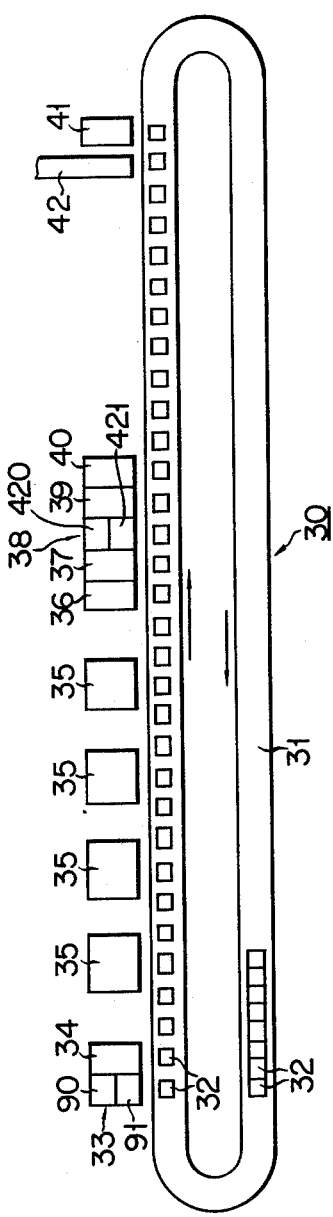
FIG. 7 is a schematic plan view of an automatic tape cassette assembling system according to this invention.

FIG. 7 is a schematic representation of the automatic assembling system of this invention for constructing the aforesaid tape cassette 1. A conveyor device 31 is operated along a horizontal transport orbit having an oblong cross section. The upper surface of the conveyor device 31 is fitted with a large number of transport jigs 32 which are carried in the direction of arrows indicated in FIG. 7. Arranged along the outside of the conveyor device 31 are a lower cassette housing half feeder 33, lower liner sheet feeder 34, four magnetic tape-loading mechanisms 35 of the same type, pad spring feeder 36, upper liner sheet feeder 37, upper cassette housing half feeder 38, screw fitting device 39, screw-examining device 40 and cassette-removing device 41 in the order mentioned as counted in the traveling direction of the conveyor 31. The magnetic tape loading mechanisms 35 are spaced from each other at a certain interval. Each of the four magnetic tape-loading mechanisms 35 is operated with respect to the specified one of every four transport jigs. The respective members of the tape cassette-assembling system are operated as described below.

1. The lower cassette housing half feeder 33 fits the housing half 2a to the transport jig 32 with the peripheral walls 15a of said housing half 2a turned upward.

2. The lower liner sheet 34 sets the lower liner sheet 26a in the lower cassette housing half 2a.

3. The magnetic tape loading mechanism 35 winds a magnetic tape about reel hubs 19 mounted on the later described separate fixed jig and transfers the reel hubs 19, magnetic tape 21 and guide rollers 20 from said separate fixed jig to the lower cassette housing half 2a placed on the transport jig 32.

4. The pad spring feeder 36 inserts the pad spring 22 into the lower cassette housing half 2a.

5. The upper liner sheet feeder 37 spreads the upper liner sheet 26b over the reel hubs 19, magnetic tape 21 and guide rollers 20 received in the lower cassette housing half 2a.

6. The upper cassette housing half feeder 38 mounts the upper cassette housing half 2b on the lower cassette housing half 2a.

7. The screw-fitting device 39 inserts screws 4 into the screw holes 4a and tightens them so as to securely join both housing halves 2a, 2b together.

8. The screw-examining device 40 examines whether the screws are firmly fixed in place by the screw fitting device.

9. The cassette-removing device 41 transfers a fully assembled cassette 1 from the transport jig 32 to a discharging conveyor 42.

The transport jig 32 and other members 33 to 38 of the subject tape cassette-assembling system will be detailed below. However, the screw-fitting device 39, screw-examining device 40 and cassette-removing device 41 have the known construction, description thereof being omitted.

Referring to FIGS. 8 to 12, the transport jig 32 comprises a base plate 43 and a setting table 44 fixed to the base plate 43 by bolts 45. A support region 46 on which the lower cassette housing half 2a is to be mounted is formed on the upper surface of the setting table 44. A pair of rotatable reel shafts 47 are projectively provided on the support region 46 of the setting table 44. Both reel shafts 47 are spaced from each other at an interval equal to that between both reel hubs 19. The upper peripheral wall of each reel shaft 47 is provided with a plurality of projections 48 which are fitted into the interspaces between the cylindrical projections 19a (FIG. 6) of the reel hub 19. A deformable O-ring 49 is provided immediately below the projections 48 for frictional abutment against the inner peripheral wall of the reel hub 19. Three locating projections 50 are projectively formed on the setting table 44 so as to be inserted into the locating holes 7a bored in the lower cassette housing half 2a. The paired reel shafts 47 and locating projections 50 are so arranged as to cause the forward side of the cassette to face the inside of the conveyor 31 when the cassette 1 is fitted on the table 44.

Figure 11:
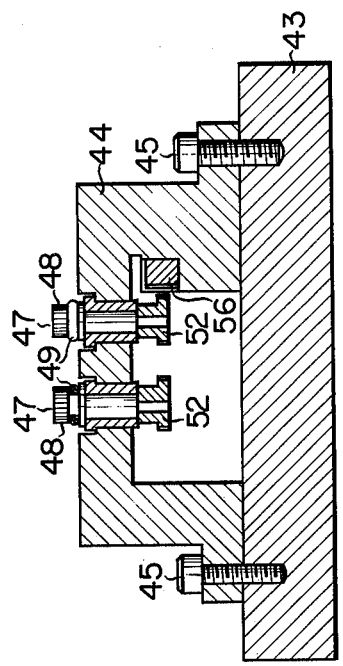
FIG. 11 is a longitudinal sectional view of the transport jig.
Figure 10:
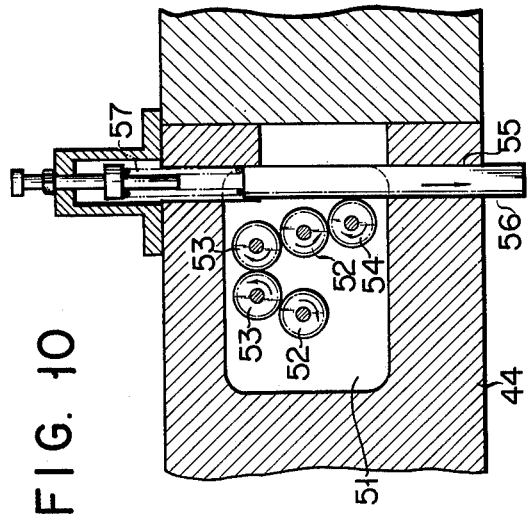
FIG. 10 is a fractional cross sectional view of the transport jig.
Figure 12:
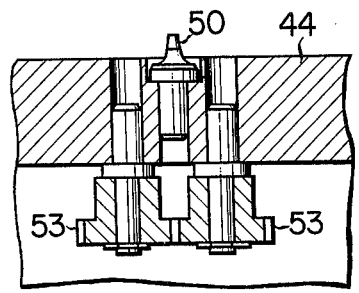
FIG. 12 is a longitudinal sectional view on line 12—12 of FIG. 8.

As shown in FIGS. 10 to 12, a space 51 is formed in the setting table 44. The lower end of each reel shaft 47 extends into the space 51 and is fitted with a gear 52. Both gears 52 are connected together by means of a pair of idling gears 53 engaging each other so as to rotate the gears 52 in the opposite directions. One of the first mentioned gears 52 engages another gear 54. All the gears 52, 53, 54 have the same module and tooth number. That side of the setting table 44 which faces the inside of the conveyor 31 is bored with a penetrating hole 55, into which a rack 56 is slidably inserted. The rack 56 engages said another gear 54 and is urged in the direction of an arrow indicated in FIG. 10 by means of a compression spring 57 engaging the inner end of said gear 54.

The setting table 44 is bored with a pair of locating holes 58 (FIG. 9) which are intended to receive the later described locating rods 59 formed on the lower cassette housing half feeder 33.

The jig 32 constructed as described above is placed on a belt conveyor 60 of the conveyor device 31 to be carried along a passage defined between the inner side wall 62a and outer side wall 62b of a frame 61. The conveyor 31 has a plurality of blocking mechanisms 63 (FIGS. 13, 14) arranged at a prescribed space. The blocking mechanism 63 comprises a pair of stop pins 64 fitted to the frame 61 so as to move vertically and a piston-cylinder 65 for effecting said vertical movement. The piston-cylinder 65 is actuated by a known limit switch (not shown) when it detects the approach of the jig 32 to push the stop pin 64 ahead of the jig 32. The stop pin 64 is brought back to its original position by a cam mechanism (not shown) after lapse of a certain length of time.

A guide plane 66 (FIG. 9) inclined downward toward the jig 32 is formed lengthwise of that portion of the outer side wall 62b of the frame 61 which faces the jig 32. That portion of the jig 32 which faces the lower edge of the outer side wall 62b of the frame 61 is provided with an inclined guide plane 67 corresponding to the aforesaid inclined guide plane 66 formed on the frame 61. The jig 32 is normally carried along by contact between both inclined guide planes 66, 67.

Figure 13:
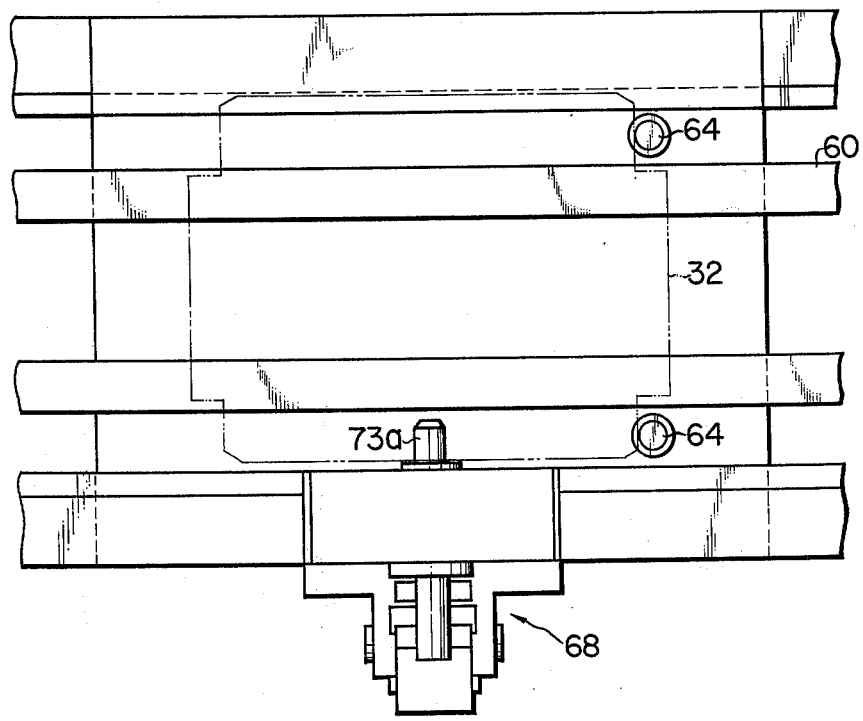
FIGS. 13 to 15 jointly present a first stop mechanism for bringing the transport jig to rest in front of the respective assembling stages.
Figure 14:
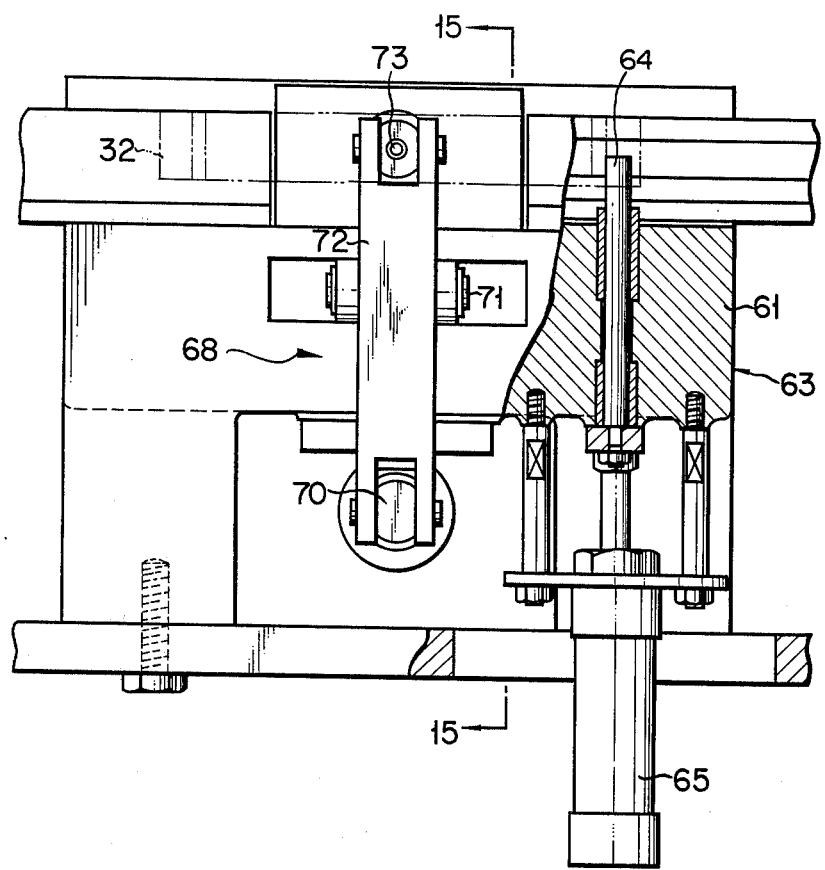
Figure 15:
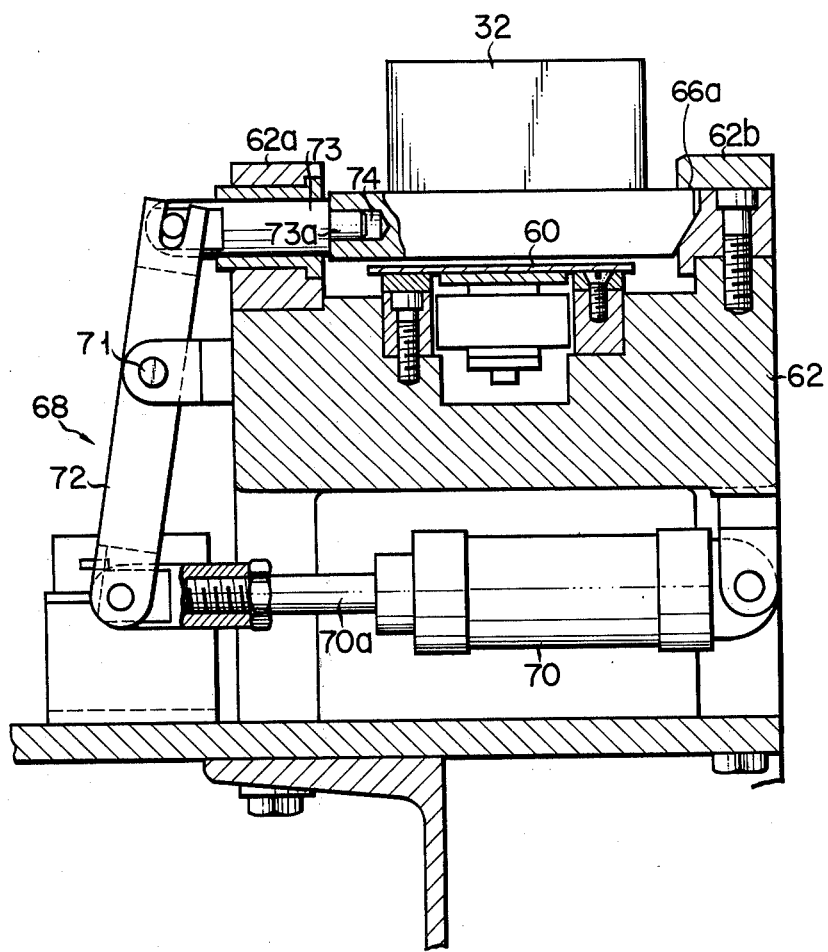
Figure 16:
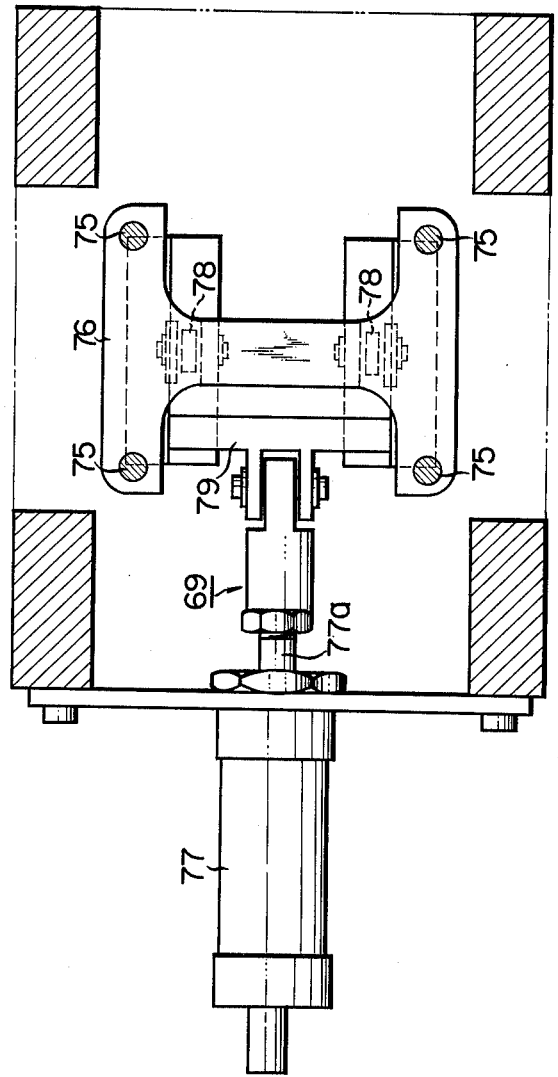
FIGS. 16 to 18 collectively illustrate a second step mechanism for bringing the transport jig to rest in front of the respective assembling stages.

Provided in front of each of the members 33 to 41 of the tape cassette-assembling system is a stop mechanism for temporarily lifting the transport jig 32 from the belt conveyer 60 to stop it. The tape cassette assembling system of this embodiment comprises a first stop mechanism 68 provided for the other members 33, 34, 36 to 41 excluding the magnetic tape-loading mechanism 35 and a second stop mechanism 69 (FIG. 16) provided for the magnetic tape-loading mechanism 35. The first stop mechanism 68 comprises a piston-cylinder 70 disposed below the conveyor 60, a lever 72 pivotally fitted to a rod 70a of the piston cylinder 70 so as to rotate about a pivot 71 and a locating rod 73 pivotally fitted to the upper end of the lever 72 and penetrating the inner lateral wall 62a of the frame 61 (FIGS. 13 to 15). The free end of the locating rod 73 is integrally fitted with a pin 73a. That side wall of the jig 32 which faces the inner lateral wall 62a of the frame 61 is bored with a locating hole 74 (FIG. 15). When the paired stop pins 64 bring the moving jig 32 to rest, then another known limit switch (not shown) is actuated for operation of the piston-cylinder 70, causing the pin 73a to be inserted into the locating hole 74 and also be locating rod 73 to press the jig 32 against the outer side wall 62b of the frame 61. The jig 32 rises above the belt conveyor 60 due to the guide plane 67 of the jig 32 sliding along the guide plane 66 of the frame 61 and is fixed in place by being pressed against the engagement wall 66a. The piston cyliner 70 is deactivated by a known cam mechanism (not shown) after a certain length of time to retract the locating rod 73. As the result, the jig 32 descends down the guide plane 66 of the frame 61 by its self weight and is put back on the conveyor 60.

Figure 17:
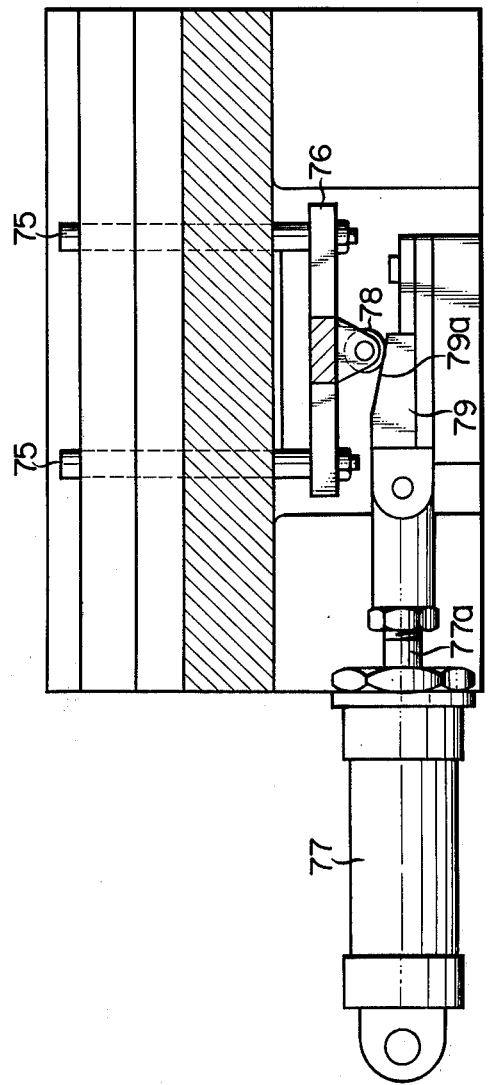
Figure 18:
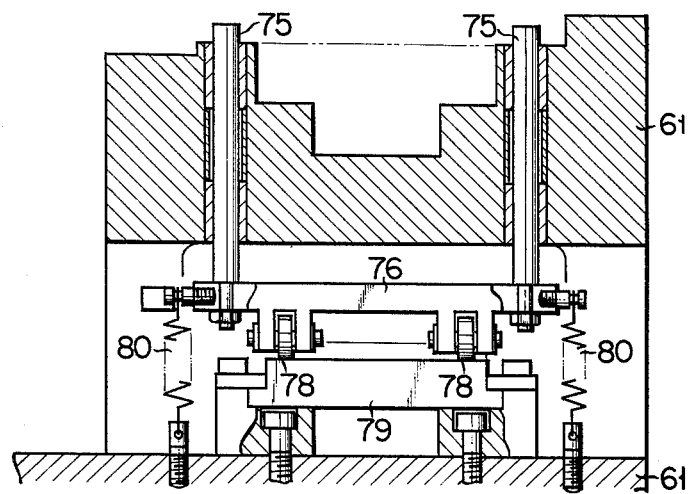

The second stop mechanism 69 (shown in detail in FIGS. 16 to 18) comprises a support plate 76 provided with four push rods 75 slidably penetrating the frame 61 and a piston cylinder 77 for lifting the support plate 76. A pair of guide rollers 78 are pivotally fitted to the underside of the support plate 76 and is normally pressed against an inclined plate 79a formed on the upper side of a cam memberr 79 fixed to a rod 77a of pistoncylinder 77 by means of tension springs 80 (FIG. 18) stretched across the support plate 76 and frame 61. When said stop pins 64 bring the jig 32 to rest, a known limit switch (not shown) is actuated for operation of the piston-cylinder 77. As the result, the cam member 79 is carried to the right side of FIG. 17 by the rod 77a to lift the support plate 76 and push rods 75 jointly by means of the guide roller 78. Push rods 75 project upward from both sides of the conveyor 60 to lift the jig 32 from the conveyor 60. The piston-cylinder 77 is deactivated by a known cam mechanism (not shown) after a certain length of time to retract the rod 77a of the piston cylinder 77. As the result, the guide rollers 78 slide down the inclined cam plane 79a, and the support plate 76 and push rods 75 fall jointly, causing the jig 32 to be put back on the conveyor 60.

Figure 8:
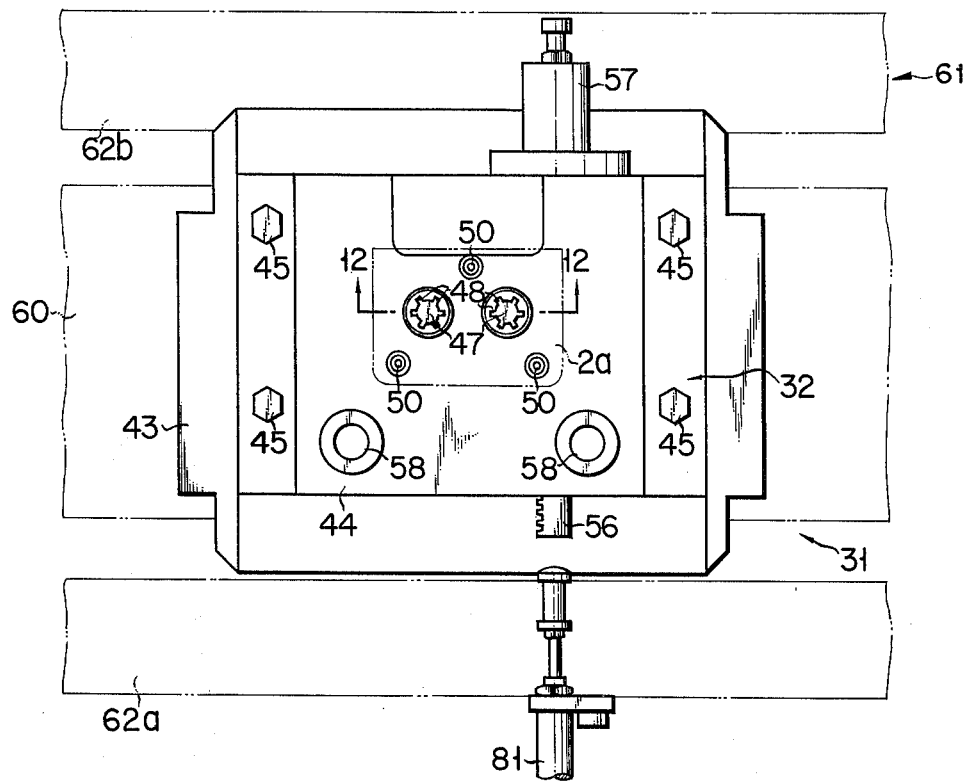
FIG. 8 is a plan view of a transport jig for successively shifting a tape cassette being constructed to the various stages of the assembly system.
Figure 9:
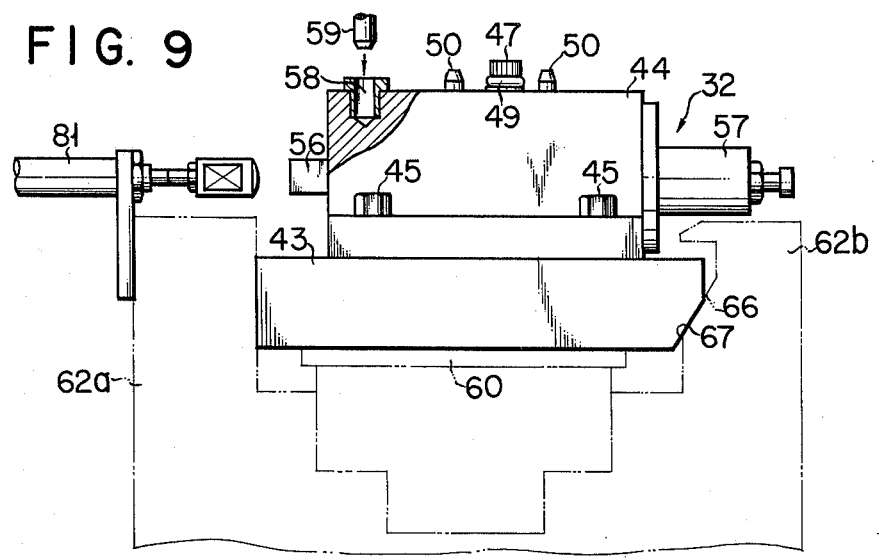
FIG. 9 is a side elevation of the transport jig as viewed from the right side of FIG. 8.

As in FIGS. 8 and 9, piston-cylinders 81 are provided for the magnetic tape-loading mechanisms 35 on the inner lateral wall 62a of the frame 61. The piston-cylinder 81 is so positioned as to be concentrated with the rack 56 of the jig 32 when the jig 32 is stopped by said stop pins 74.

When the piston cylinder 81 is actuated, the rack 56 is pushed into the jig 32 to rotate the gear 52 fixed to the reel shaft 47. When the piston cylinder 81 is deactivated, the compression spring 57 pushes the rack 56 in the direction of an arrow indicated in FIG. 10, causing the gear 52 to rotate so as to tighten the magnetic tape 21 wound about the reel hubs 19.

The jig 32 is brought to rest by the blocking mechanism 63 is front of the respective members 33 to 41 of the tape cassette assembling system and then set in a prescribed position by the stop mechanism 68 or 69. In the case of the second stop mechanism 69, the jig 32 is lifted in a free state by the push pins 53, and exactly located relative to the magnetic tape-loading mechanism 35 by the locating rods 59 inserted into the locating holes 58.

Figure 19:
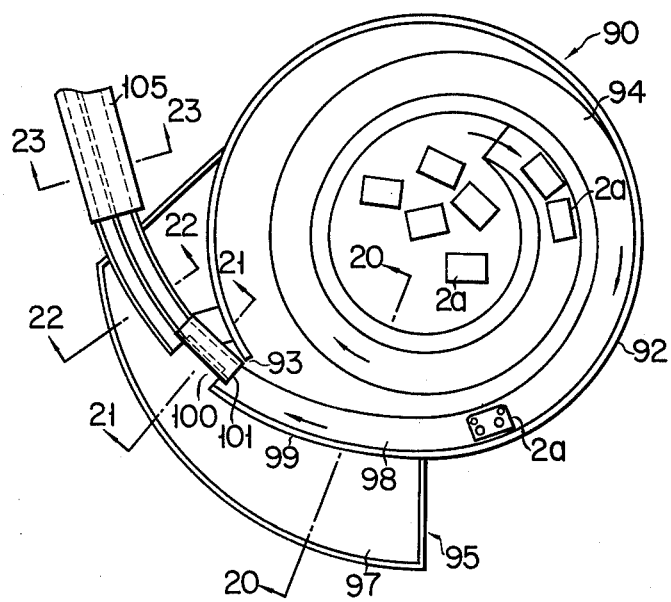
FIG. 19 is a sorting mechanism of the lower cassette housing half feeder.
Figure 20:
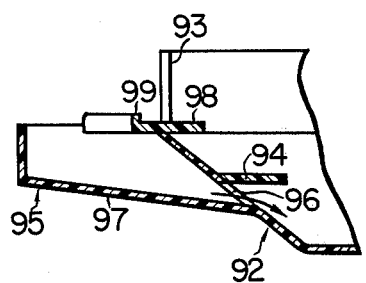
FIGS. 20 to 23 are cross sectional views on lines 20—20, 21—21, 22—22 and 23—23 of FIG. 19 respectively.
Figure 21:
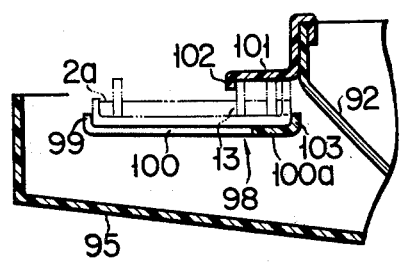
Figure 22:
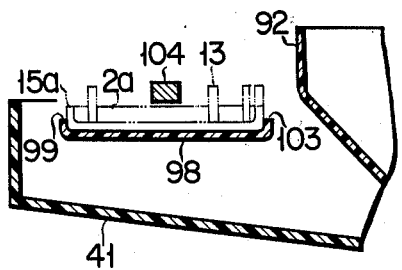
Figure 23:
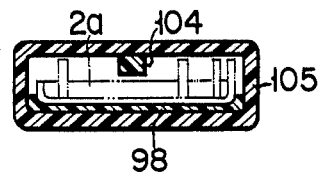
Figure 24:
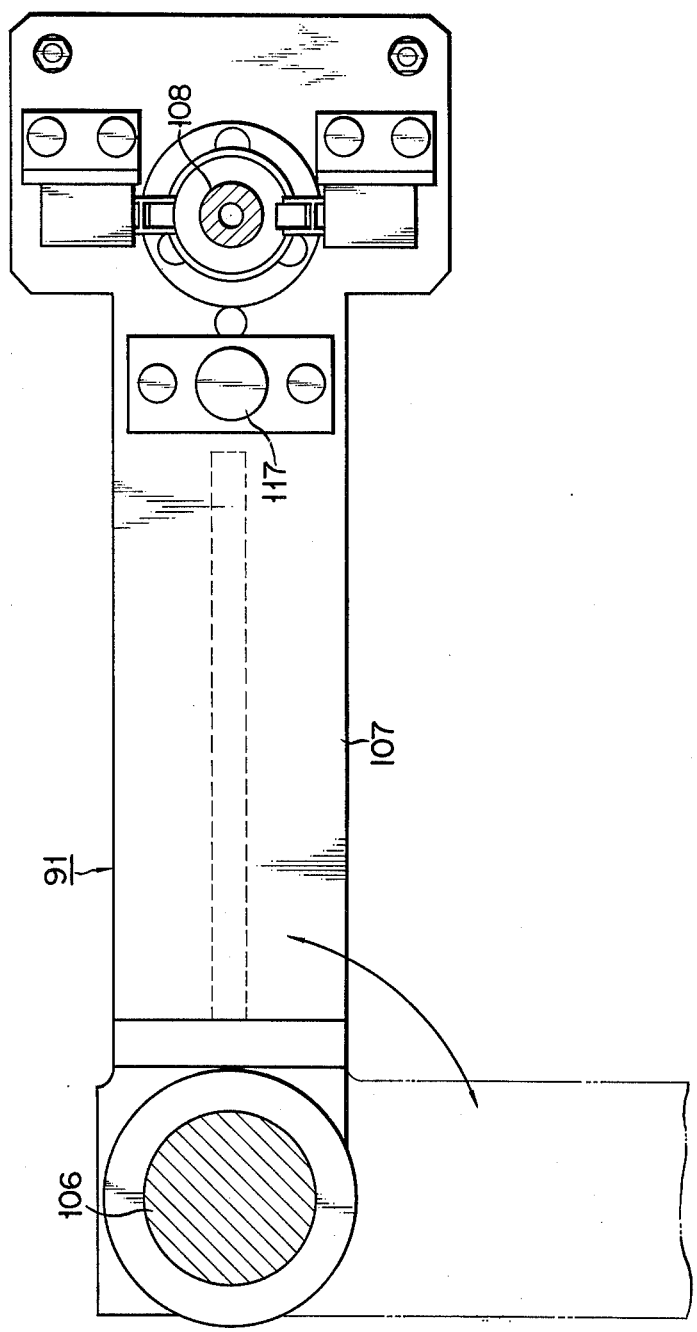
FIG. 24 is a fractional cross sectional view of a loading mechanism of the lower cassette housing half feeder.

The lower cassette housing half feeder 33 (shown in detail in FIGS. 19 to 29) comprises a cassette housing half-sorting device 90 (FIGS. 19 to 23) and a cassette housing half-locating device 91 (FIGS. 24 to 29). The cassette housing half-sorting device 90 comprises a barrel body 92 having a substantially truncated round conical shape and containing a large number of lower cassette housing halves 2a at the bottom. The body 92 has an inclined helical passage 94 extending upto an outlet 93 (FIG. 20) along the inner peripheral wall of said body 92. When the barrel body 92 is shaken by a drive source (not shown), then the lower cassette housing halves 2a are lifted upward linearly through the helical passage 94 up to the outlet 93 in the manner already known. A receptacle 95 is provided on the upper outside of the barrel 92. The receptacle 95 communicates with the interior of the barrel body 92 through an opening 96, and comprises a bottom wall 97 inclined downward toward the barrel body 92. Provided above the receptacle 95 is a band-shaped guide passage 98 connected with the inclined helical passage 94. A deflectively positioned lower cassette housing half 2a falling off the guide passage 98 is brought back to the barrel body 92 through the opening 96 from the bottom wall 97 of the receptacle 95. The guide passage 98 is curved along the periphery of the barrel body 92, and provided with an upward projecting edge 99 to prevent a lower cassette housing half 2a traveling on the guide passage 98 from falling off the selecting device 90. As shown in FIGS. 19 and 21, a lower cassette housing half-removing notch 100 is formed at the prescribed part of the guide passage 98 with a bottom portion 100a left out. A plate-like sorting member 101 is disposed above the bottom portion 100a substantially in parallel with the guide passage 98. A stop edge 102 extends downward from the outer edge of the selecting member 101. The guide passage 98 has an inner upright edge 103 corresponding to the outer projecting edge 99. The stop edge 102 of the sorting member 101 is so disposed on the sorting member 101 as to allow the tape guide pins 13 of the lower cassette housing half 2a whose forward portion is directed to the barrel body 92 to slide along the inner wall of the stop edge 102. An elongate strip 104 is provided about that section of the guide passage 98 which follows the sorting member 101 at a slightly higher level than the upper surface of the upright peripheral wall 15a of the lower cassette housing half 2a (FIGS. 1 and 22). The strip 104 restricts the vertical movement of the lower cassete housing half 2a. That section of the guide passage 98 which follows the outer side of the receptacle 95 is enwrapped with a cover 105 of transparent plastics material (FIGS. 19 and 23).

There will now be described the operation of the sorting device 90. When the barrel body 92 is shaken, a plurality of lower cassette housing halves 2a received in said barrel body 92 are successively moved up the inclined helical passage 94 and travel on the guide passage 98 to the sorting member 101. A lower cassette housing half 2a having a prescribed posture, namely, the one whose forward side faces the barrel bydy 92 with the tape guide pins 13 turned upward is brought below the selecting member 101. At this time the upper outer side of the guide pins 13 slidably abuts against the inner wall of the stop edge 102 of the selecting member 101. Though, therefore, the lower cassette housing half 2a is placed only on the narrow bottom portion 100a of the guide passage 98 in that section thereof which is provided with a notch 100, the lower cassette housing half 2a is supported by the stop edge 102, bottom portion 100a and inner upright edge 103 and passes through the sorting member 101 without falling through the notch 100. However, a lower cassette housing half 2a which has traveled on the guide passage 98 with a posture other than specified above falls into the barrel body 92 before reaching the sorting member 101 or into the receptacle 95 through the notch 100 to return to the barrel body 92, failing to pass through the sorting member 101. A lower cassette housing half 2a which happens to be, for example, turned upside down cannot be brought below the selecting member 101, because the bottom wall 3a of said cassette housing half 2a strikes against the stop edge 102 of the selecting member 101, and eventually falls off the guide passage 98 into the barrel body 98. Though brought below the sorting member 101, a lower cassette housing half 2a whose forward side is directed outside of the barrel body 92 has no portion which can be supported by the stop edge 102 of the sorting member 101 but has the bottom 3a only mounted on the narrow bottom portion 100a of the guide passage 98. As the result, such deflectively positioned lower cassette housing half 2a is thrown out of balance and falls through the notch 100 into the receptacle 95.

A lower cassette housing half 2a which has passed through the sorting member 101 with a presecribed shape and posture is further carried on the guide passage 98, while being guided by the outer and inner projecting edges 99, 103 and prevented from being thrown upward by the elongate strip 104. After passing through the plastics cover 105, a lower cassette housing half 2a having a specified posture takes a position waiting for loading.

Figure 25:
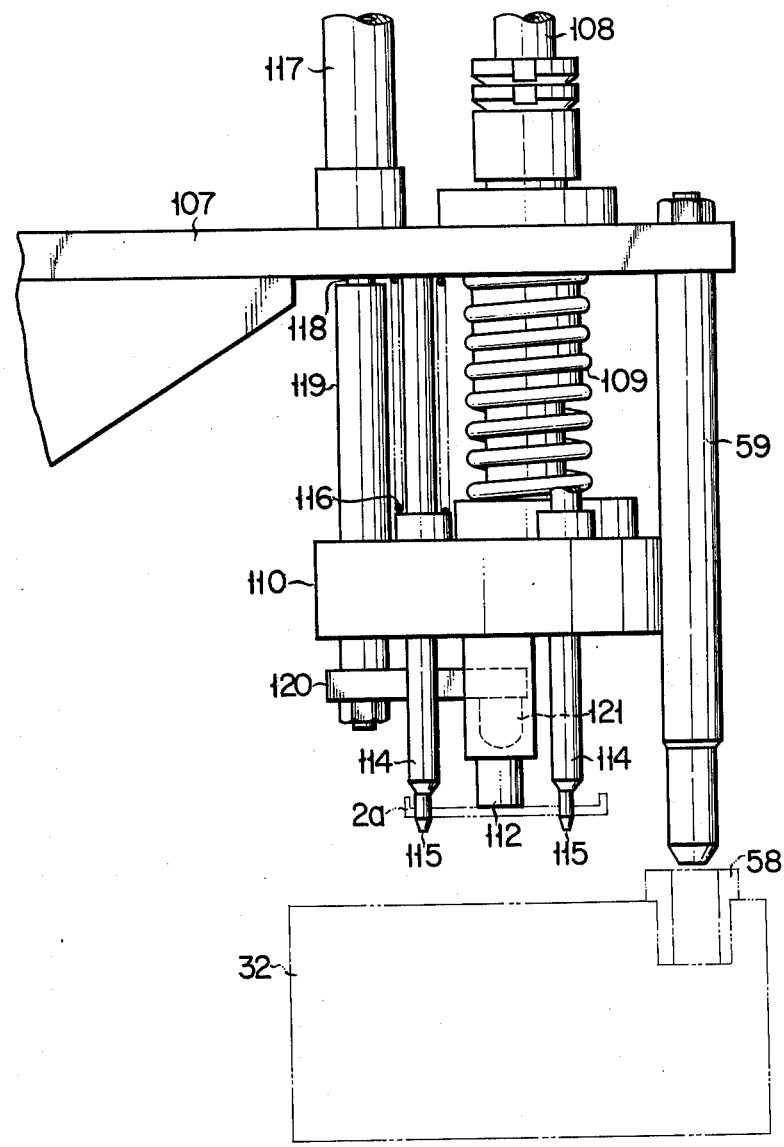
FIGS. 25 to 27 are side elevations of the lower cassette housing half loading mechanism of FIG. 24, showing the sequential operating steps of said mechanism.
Figure 26:
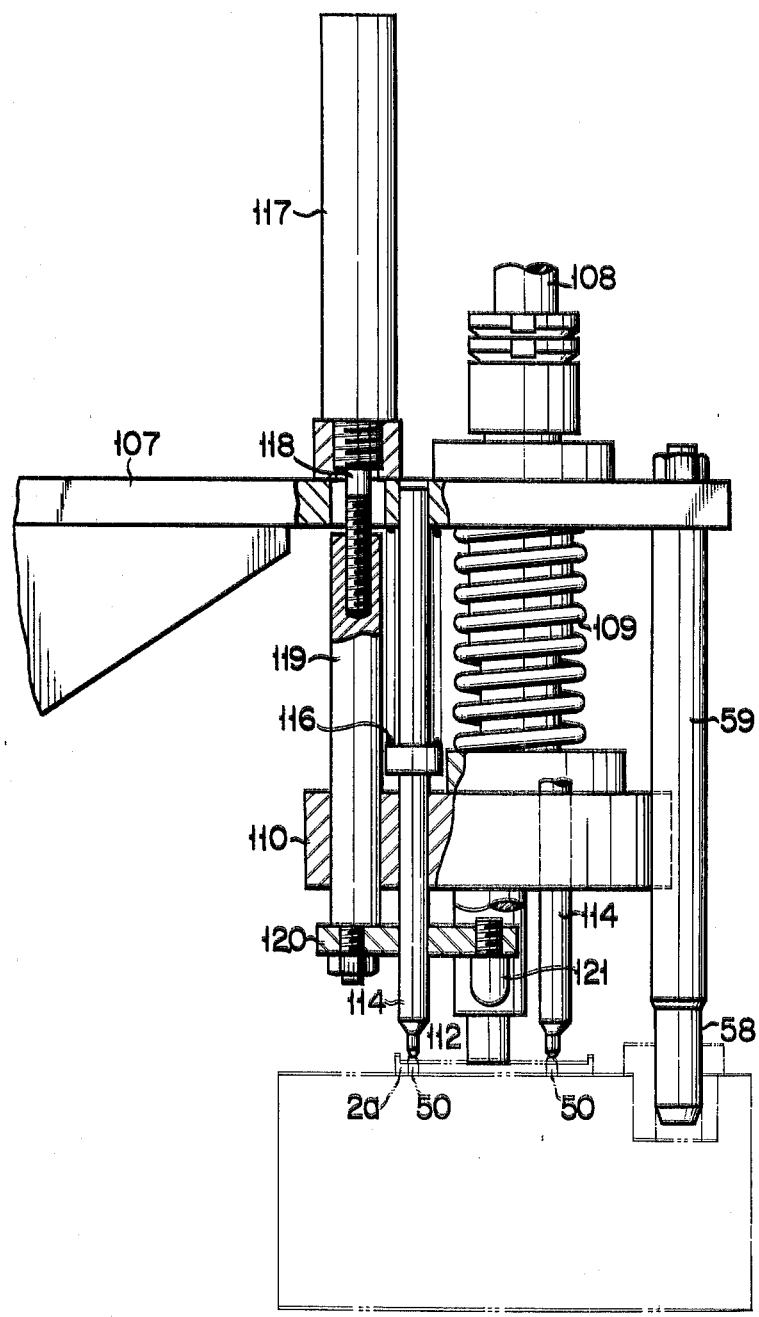
Figure 27:
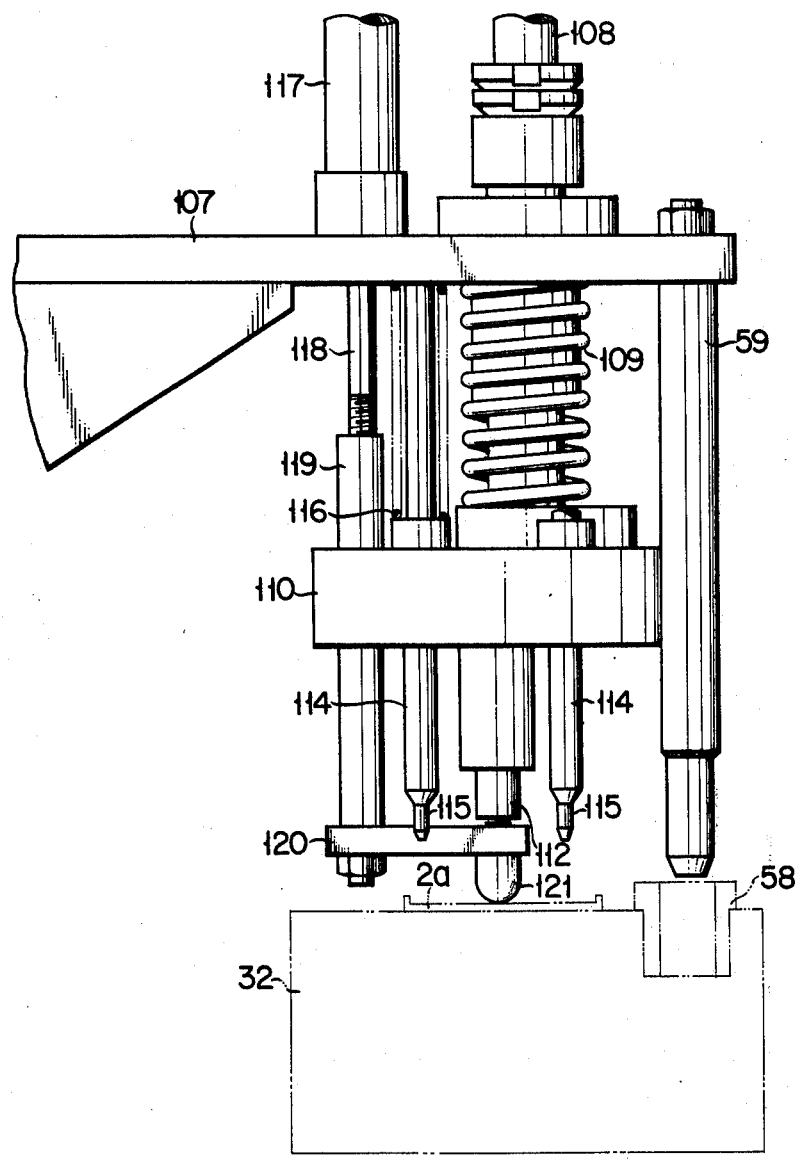
Figure 28:
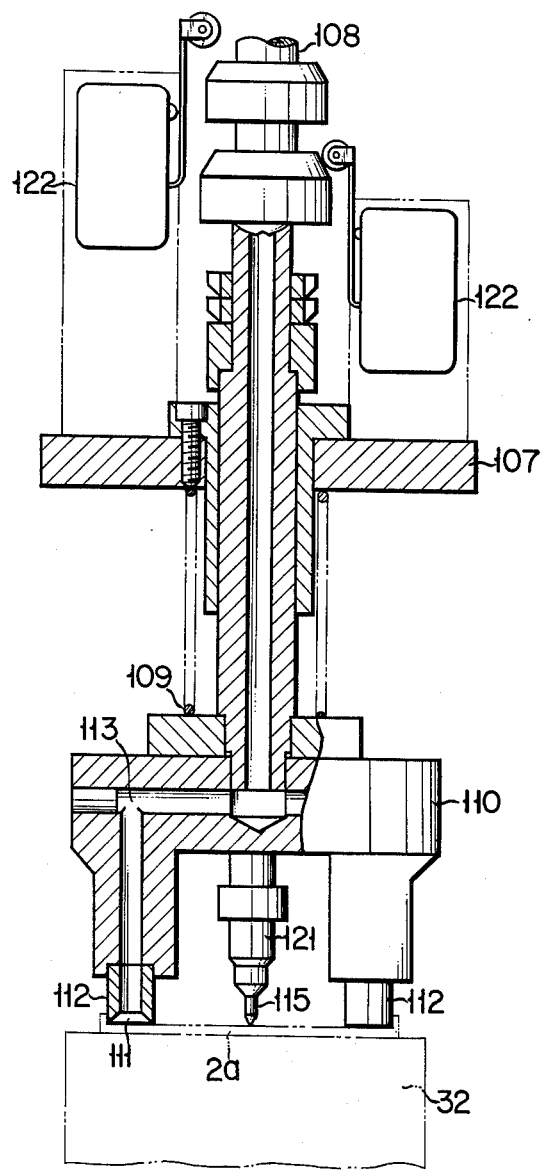
FIG. 28 is a cross sectional view of the lower cassette housing half-loading mechanism of FIG. 24 as viewed from the right side of FIG. 26.
Figure 29:
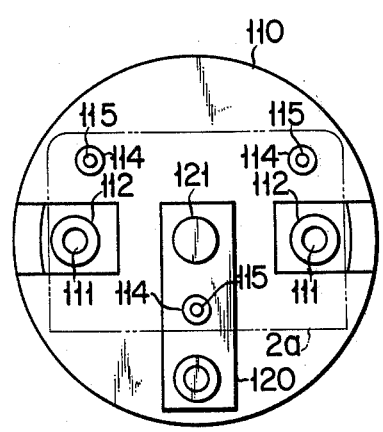
FIG. 29 is a bottom view of a support block of the lower cassette housing half-loading mechanism.

As shown in FIGS. 24 to 29, the lower cassette housing half-loading device 91 has an arm 107 fitted to an upright fixed shaft 106 so as to move vertically and rotate horizontally through an angle of 90° by driving means (not shown). The outer end of the arm 107 is fitted with an air suction pipe 108 vertically movable relative to the arm 107, and normally urged downward by a compression spring 109 (FIG. 25). A substantially circular support block 110 is fixed to the underside of the air suction pipe 108. A pair of projections 112 having an air suction port 111 bored at the lower end extend downward from the bottom of the block 110 (FIGS. 28 and 29). The air suction port 111 communicates with the passage of the air suction pipe 108 through a passage 113 formed in the block 110. The passage of the air suction pipe 108 is connected an air suction device (not shown). Three guide rods 114 each fitted with a guide pin 115 penetrate the forward end of the arm 107 and block 110 for vertical movement and are normally urged downward by compression springs 116. These three guide pins 115 are so arranged as to correspond to the three locating holes 7a of the lower cassette housing half 2a. The rotary arm 107 has an air cylinder 117 (FIGS. 26 and 27). A supporting rod 119 is fixed to a rod 118 of said air cylinder 117. The supporting rod 119 slidably passes through the block 110 and has its lower end fitted with a keep arm 120 horizontally extending substantially to the lower central part of the block 110. A keep member 121 extends downwardly from the end of the keep arm 120. The foremost end of the rotary arm 107 is fitted with a pair of downward extending locating rods 59. These locating rods 59 are so arranged as to face the locating holes 58 of the transport jig 32, and, when inserted into said locating holes 58, exactly align the lower cassette housing half loading device 91 with the jig 32. Two limit switches 122 (FIG. 28) are provided on the surface of the rotary arm 107 and respectively used to detect the upper and lower positions of the air suction pipe 108 for control of an air suction device (not shown).

There will now be described the operation of the lower cassette housing half loading device 91. Initially, the rotary arm 107 is disposed at a position (indicated in chain lines in FIG. 24) higher than the waiting position (not shown) of said sorting device 90. When brought downward by drive means (not shown), the rotary arm 107 pushes the guide pins 115 into the locating holes 7a of the lower cassete housing half 2a, and continues a descent against the force of the compression springs 116, until the projections 112 abut against the bottom wall of the lower cassette housing half 2a. When the air suction devie (not shown) is actuated, the lower cassette housing half 2a is sucked to the suction ports 111 (FIG. 28) of the projections 112. When moved upward and then swung horizontally, the rotary arm 107 takes a solid line position shown in FIG. 24, namely, a position above the transport jig 32 supported on the conveyor devcie 31 (FIG. 25). When brought down, the rotary arm 107 pushes the locating rods 59 into the locating holes 58 of the jig 32 to align the lower cassette housing half 2a with the jig 32. When the rotary arm 107 is further brought downward, the lower end of the guide pins 115 abuts against the upper end of the locating projections 50 of the jig 32. When the arm 107 falls further downward, the springs 116 are compressed and the lower cassette housing half 2a sucked to the projection 112 reaches the surface of the jig 32 (FIG. 26). At this time, the reel hub supporting holes 5a and locating holes 7a of the lower cassette housing half 2a (FIG. 1) accurately engage the reel shafts 47 and locating projections 50 of the jig 32. When the air cylinder 117 is thereafter actuated, the rod 118 falls with the supporting rod 119 to press the keep member 121 of the keep arm 120 against the surface of the bottom wall of the lower cassette housing half 2a. At this time, negative pressure applied to the suction ports 111 up to this time is terminated. Thereafter, the rotary arm 107 is lifted with the keep member 121 pressed against the surface of the bottom wall of the lower cassette housing half 2a. (FIG. 27). When the air cylinder 117 retracts the rod 118, the rotary arm 107 is moved upward to the original position. Later, the rotary arm 107 rotates to a level above the waiting position of the lower cassette housing half 2a, ready for the succeeding loading of said cassette housing half 2a.

Figure 30:
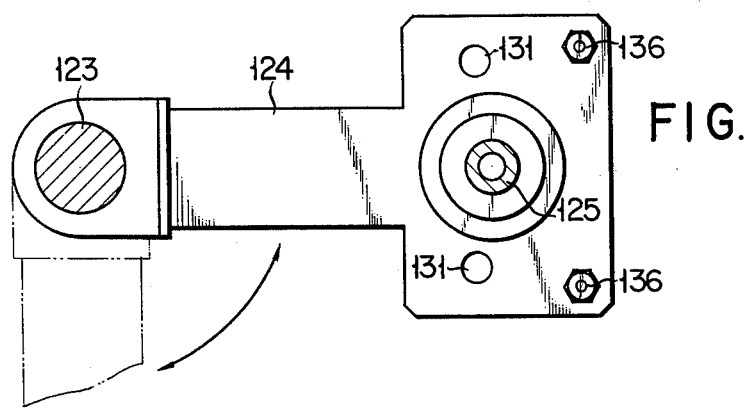
FIG. 30 is a fractional cross sectional view of a lower liner sheet feeder.
Figure 31:
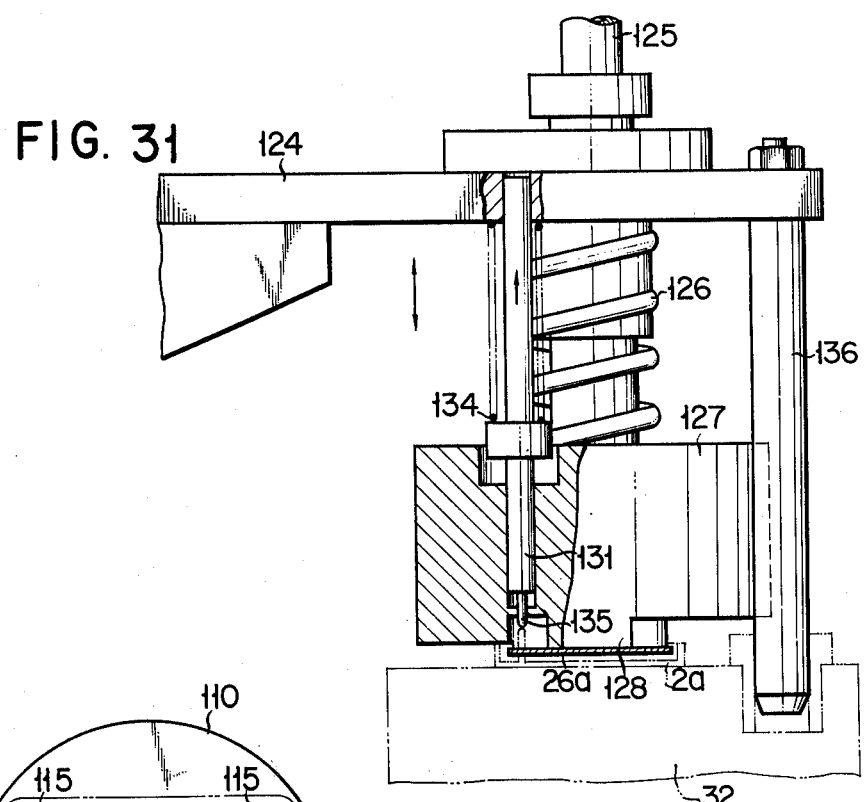
FIG. 31 is a fractional side elevation, partly in section of the lower liner sheet feeder.
Figure 32:
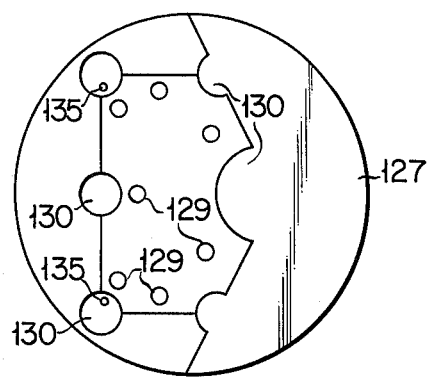
FIG. 32 is a bottom view of a circular block of the lower liner sheet feeder.

The transport jig 32 loaded with the lower cassette housing half 2a is carried by the conveyor device 31 and is brought to rest in front of the lower liner sheet feeder 34. As shown in FIGS. 30 to 32, this lower liner sheet feeder 34 comprises a rotary arm 124 fitted to an upright stationary shaft 123 so as to move vertically and rotate horizontally through an angle of 90°. An air suction pipe 125 is fitted to the outer end of the rotary arm 124 so as to move vertically relative thereto, and normally urged downward by a compression spring 126 (FIG. 31). A substantially circular block 127 is fixed to the lower end of the air suction pipe 125. An air suction section 128 is formed on the underside of the block 127. The air suction section 128 is provided with a plurality of air suction ports 129 (FIG. 32) which are connected to a passage (not shown) formed in the air suction pipe 125 through a passage (not shown) provided in the block 127. The passage of the air suction pipe 125 is connected to an air suction device (not shown). A plurality of depressions 130 (FIG. 32) are formed in the air suction section 128 of the block 127 to allow the free extension of the various projecting members of the lower cassette housing half 2a. A pair of guide rods 131 (only one indicated in FIG. 31) slidably penetrate the rotary arm 124 and block 127, and are normally urged downward by compression springs 134. The guide rods 131 have guide pins 135 integrally fitted so as to face the locating holes 132 (FIG. 1) of the liner sheet 26a. The guide pins 135 slidably penetrate holes bored in the underside of the block 127 and project into the depressions 130. A pair of locating rods 136 extending perpendicularly downward are provided on the outermost end portion of the rotary arm 124.

Initially, the rotary arm 124 occupies a chain line position shown in FIG. 30 above a sheet holder (not shown) carrying a large number of superposed liner sheets 26a. Later, the arm 124 is brought downward by drive means (not shown) to cause the air suction section 128 of the block 127 to abut against the surface of the uppermost liner sheet 26a and also the locating pins 135 to be inserted into the liner sheet-locating holes 132 (FIG. 1). At this time, the air suction device (not shown) applies a negative pressure to the suction ports 129, causing the uppermost liner sheet 26a to be securely sucked to the air suction section 128. The rotary arm 124 is lifted and then swung while carrying the uppermost liner sheet 26a, until said arm 124 is brought to a solid line position (FIG. 30), namely, above the transport jig 32. When the rotary arm 124 begins to fall, then the locating rods 136 are first fitted into the locating holes 58 of the jig 32 to align the block 127 with the lower cassette housing half 2a placed on the jig 32. The guide pins 135 abut against the upper surface of the locating pins 18a of the low cassette housing half 2a. When the rotary arm 124 is brought further downward, the guide pins 135 are retracted into the block 127 against the force of the compression springs 134. Th air suction section 128 of the block 127 abut against the bottom wall of the lower cassette housing half 2a through the liner sheet 26a. A shock occurring at this time is reduced by the elasticity of the compression spring 126. After the air suction device (not shown) ceases to be operated, the rotary arm 124 is lifted and swung back to the chain line position of FIG. 30, with the lenear sheet 26a left at a prescribed position in lower cassette housing half 2a.

The transport jig 32 loaded with the uppermost liner sheet 26a is transferred the conveyor device 31 and is brought to rest in front of one of the magnetic tape loading mechanisms 35. As shown in FIG. 133, the magnetic tape loading mechanism 35 comprises a guide roller-fitting device 141, reel hub fitting device 142, magnetic tape takeup device 143 and magnetic tape transferring device 144 in the order mentioned as counted clockwise around a turn table 140 which is allowed to intermittently rotate through an angle of 90°. Four magnetic tape takeup jigs 145 are fixed to the surface of the turn table 140 at a cimcumferential interval of 90° so as to face the above-mentioned member 141 to 144.

Figure 34:
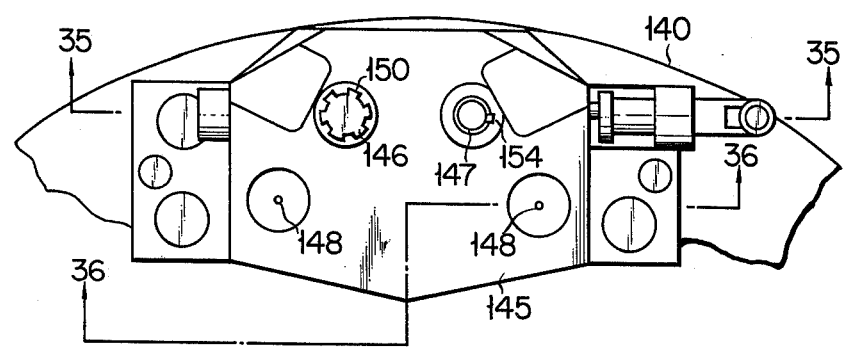
FIG. 34 is a plan view of a magnetic tape takeup jig of the magnetic tape loading mechanism.
Figure 35:
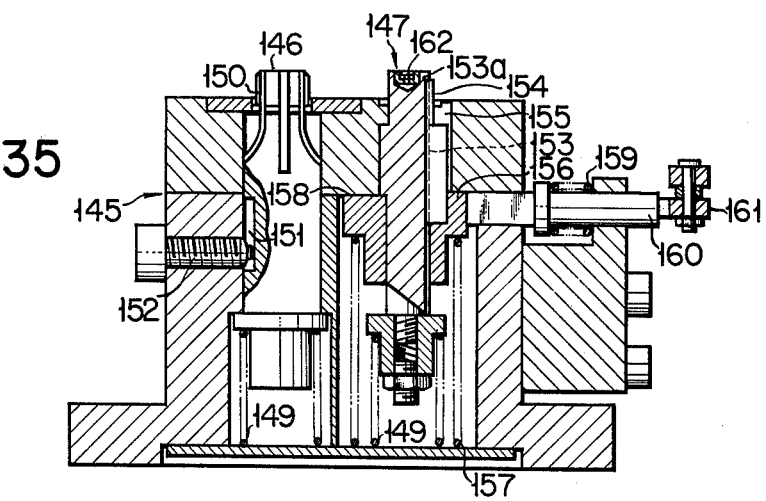

As shown in FIGS. 34 to 36, a pair of reel shaft 146, 147 and a pair of roller shafts 148 are projectively formed on the upper surfaces of the magnetic tape takeup jig 145 so as to correspond to the positions of the reel hubs 19 and guide rollers 20 in the tape cassette respectively. The reel shafts 146, 147 vertically slide through the magnetic tape takeup jig 145 and are normally urged upward by compression springs 149. One reel shaft 146 has a plurality of pawls 150 formed on the upper periphery for engagement with the projections 19a of the reel hub 19, and is prevented from being rotated by a key 152 fitted into a keyway 151. The other reel shaft 147 has a longitudinal keyway 153 formed on the periphery, and a key 154 is slidably fitted into said keyway 153. The key 154 also slidably engages a keyway 155 formed in the jig 145 to prevent the reel shaft 147 from being rotated and cause the upper part of said reel shaft 147 to project above the surface of the jig 145. The upper end of the key 154 engages a projection 153a formed at the upper end of the keyway 153 to be prevented from projecting higher than the upper end of the keyway 153. When brought into the reel hub 19, the key 154 has its upper end fitted into one of the interspaces between the plurality projections 19a (FIG. 6) of the reel hub 19 to prevent said reel hub 19 from being rotated. In the jig 145, a sleeve 156 slidably engages the reel shaft 147. The aforesaid key 154 is fixed to the sleeve 156. This sleeve 156 is urged upward by a compression spring 157 and has a shoulder portion 158 formed at the upper end. Provided on the side wall of the jig 145 is a lock bar 160 which is capable of horizontal reciprocation and whose inner end is pressed against the peripheral wall of the sleeve 156 by a compression spring 159. When the sleeve 156 is pushed downward against the force of the compression spring 157, the lock bar 160 is moved to the upper end of the shoulder portion 158 of the sleeve 156 by the spring 159 to prevent the sleeve 156 and key 154 from being lifted. A lever 161 is actuated by a cam (not shown) to retract the lock bar 160 against the force of the spring 159.

The upper end of the reel shaft 147 is provided with a ball bearing 162 cooperating with the later described reel hub-driving mechanism. The roller shaft 148 is normally urged upward by compression springs 163 (only one indicated in FIG. 36).

Figure 38:
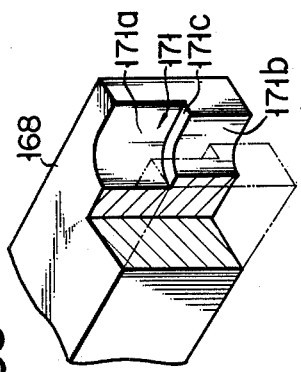
FIG. 38 is an oblique view of the forward end portion of a roller pushing arm of the guide roller-fitting device.
Figure 39:
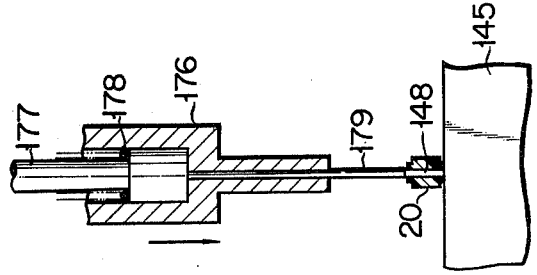
FIG. 39 is a side elevation of the guide roller-fitting device, showing the condition in which the guide roller is inserted into the tape takeup jig.

As shown in FIGS. 37 to 39, the guide roller fitting device 141 comprises a pair of cylindrical magazines 165 (only one indicated) fixed to a stationary arm 164. Since the paired magazines 165 and corresponding devices are respectively of substantially the same type, the following description only refers to each counterpart thereof. The cylindrical magazine 165 is hollow and contains, as shown in FIG. 37, a large number of guide rollers 20 arranged one atop another. A roller-pushing device 166 is provided at the lower end of the magazine 165. The roller pushing device 166 comprises a housing 167 securely mounted on a frame (not shown) and a roller-pushing arm 168 received in the housing 167 for horizontal reciprocation. The rear end of the housing 167 is fitted with an air cylinder 169, whose rod 170 is fixed to the rear end of the roller-pushing arm 168. A roller-receiving depression 171 having a substantially U-shaped horizontal cross section is formed at the forward end of the roller pushing arm 168. As shown in FIG. 38, the depression 171 comprises an upper portion 171a having a substantially equal diameter to that of the body of the respective guide rollers 20 and a lower portion 171b having a substantially equal diameter to that of the projection 20b of said guide rollers 20. A shoulder portion 171c is formed between the upper and lower portions 171a and 171b.

A pair of roller guide devices 172 (only one indicated) is provide adhead of the stationary arm 164 (FIG. 37) above the roller shaft 148 of the jig 145. The roller guide device 172 comprises a vertically movable plate 175 fixed to a rod 174 of an air cylinder 173, a sleeve 176 attached to the plate 175 and a rod 177 penetrating the arm 164 and slidably received in the sleeve 176. The rod 177 is normally pressed against a shoulder portion 176a of the sleeve 176 by a compression spring 178 and has a guide pin 179 passing through a small hole 176b formed in the lower part of the sleeve 176.

There will now be described a guide roller-fitting device 141. Initially, the roller pushing device 166 and roller guide device 172 are positioned as shown in FIG. 37. A guide roller 20 is placed in the depression 171 of the roller pushing arm 168 and set in place by the shoulder portion 171c. When the air cylinder 169 is operated, the roller-pushing arm 168 horizontally moves forward to bring the guide roller received in the depression 171 immediately below the guide pin 179 of the roller guide device 172. When the air cylinder 173 is actuated, the plate 175, sleeve 176 and rod 177 are jointly brought down, causing the guide pin 179 to penetrate the hole of the guide roller 20 and the lower part 171b of the depression 171 and abut against the upper end of the roller shaft 148. A shock occurring at this time is absorbed by the spring 178 of the roller guide device 172 and the spring 163 of the jig 145. When the air cylinder 169 of the roller pushing device 166 is operated to bring the roller-pushing arm 168 back to the original position, thus the guide roller 20 gravitationally falls to engage the roller shaft 148 of the jig 145 (FIG. 39). The succeeding one of the numerous guide rollers 20 contained in the magazine 165 falls into the depression 171 of the roller-pushing arm 168. The roller guide device 172 returns to the original position, ready for the following cycle of operation.

When the guide rollers 20 are loaded on the jig 145, the turn table 140 rotates through an angle of 90° to carry the jig 145 to the reel hub-fitting device 142.

The reel hub fitting device 142 comprises, as shown in FIGS. 40 to 44, a pair of cylindrical magazines 181 (only one indicated) fixed to the stationary arm 180. Since the paired magazines 181 and associated devices are respectively of the same type, the following description only refers to each counterpart thereof. The magazine 181 is hollow and contains a large number of reel hubs 19 arranged one atop another. The magazine 181 has a narrow longitudinal guide ridge 182 (FIG. 41), which is fitted into a magnetic tape takeup groove 183 formed in the periphery of the reel hub 19 to prevent said reel hub 19 from being rotated. A pair of reel hub-pushing devices 184 (only one indicated) are mounted on a frame (not shown), and each comprise a housing 185 fixed to the frame, and reel hub-pushing arm 186 received in the housing 185 for horizontal reciprocation. An air cylinder 187 is fixed in the housing 185. A rod 188 of the air cylinder 187 is fitted to the rear end of the reel hub-pushing arm 186, whose forward end is provided with a reel hub-receiving depression 189 for receiving one reel hub 19 each time. A pair of reel hub loading devices 190 (only one indicated) are disposed at the forward end of the stationary arm 180 above the reel shafts 146, 147 of the jig 145. The reel hub loading device 190 comprises a vertically movable plate 193 fixed to a rod 192 of air cylinder 191, sleeve 194 attached to the plate 193 and rod 195 vertically slidable through the stationary arm 180 and sleeve 194 but incapable of rotation. The rod 195 has a stop pin 197 inserted into a slot 196 formed in the sleeve 194 and is restricted in vertical movement relative to the sleeve 194 by means of the stop pin 197 and slot 196. The rod 195 is normally urged downward by a compression spring 199 engaging the shoulder portion 198 of said rod 195.

Provided at the lower end of the rod 195 is a reel hub holder 200 having engagement projections 201 fitted into the interspaces between the projection 19a of the reel hub 19. A deformable O-ring 202 is disposed on the reel hub holder 200 above the projections 201.

Figure 40:
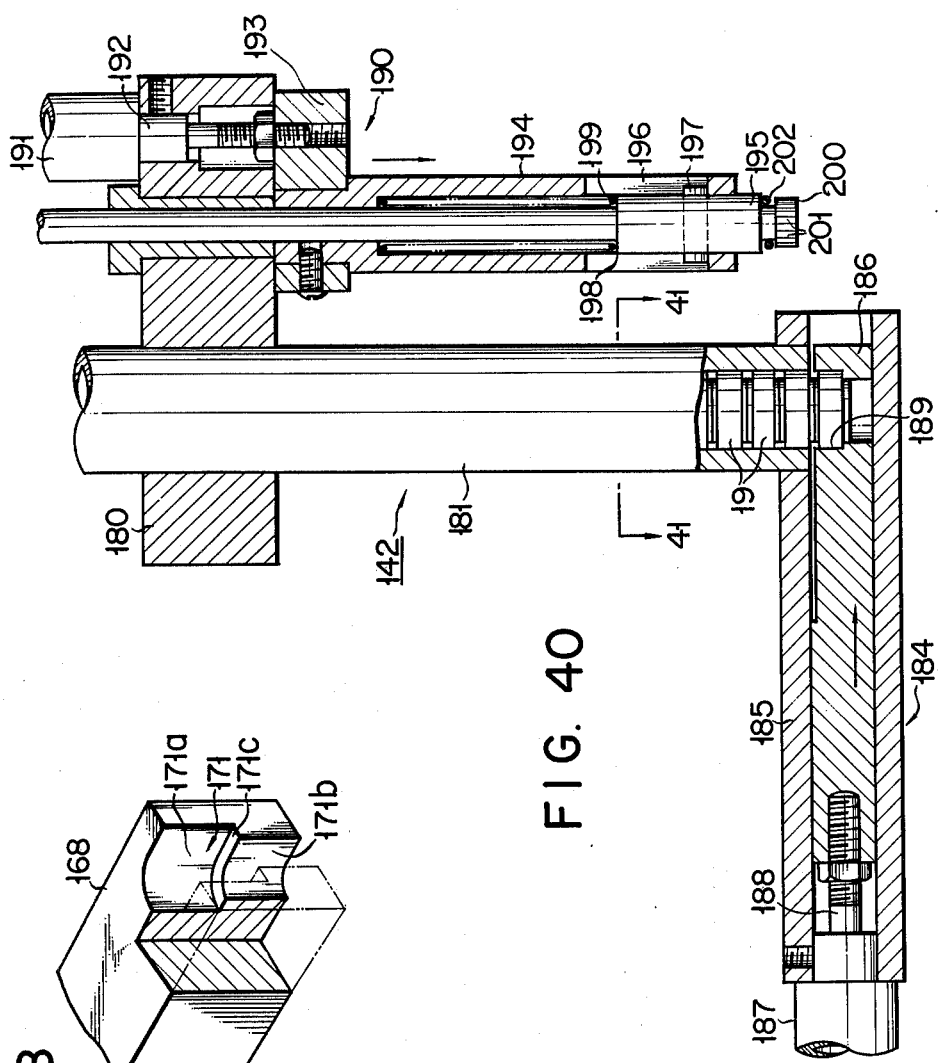
FIG. 40 is a longitudinal sectional view of a reel hub-fitting device of the magnetic tape loading mechanism.

There will now be described the operation of the reel hub-fitting device 142. Initially, the reel hub-pushing device 184 and reel hub loading device 190 are positioned as shown in FIG. 40. A reel hub 19 is received in the depression 189 of the reel hub-pushing arm 186. When the air cylinder 187 is operated, the reel hub-pushing arm 186 is horizontally carried forward to bring the reel hub 19 received in the depression 189 immediately below the reel hub holder 200 of the reel hub loading device 190 (FIG. 42). When the air cylinder 191 is actuated, the plate 193, sleeve 194, and rod 195 jointly descent, causing the reel hub holder 200 to engage the reel hub 19 and also the O-ring 202 to be forced into the reel hub 19. After the air cylinder 191 is operated again to lift the rod 195 together with the reel hub 19, the air cylinder 187 is actuated to bring the reel hub pushing arm 186 back to the original position (FIGS. 40 and 43). At this time, the succeeding one of the reel hubs 19 contained in the magazine 181 falls into the depression 189 of the reel hub-pushing arm 186. The air cylinder 191 is operated again to bring down the rod 195 until the lower end of the reel hub holder 200 abuts against the upper end of the reel shafts 146, 147 of the jig 145 when the rod 195 is brought further down, only the sleeve 194 surrounding the rod 195 falls, because the compression spring 199 has a smaller urging force than the compression spring 149 (FIG. 35) of the jig 145. As the result, the reel hubs 19 engage the reel shafts 146, 147 (FIG. 44). Thereafter, the air cylinder 191 returns the reel hub loading device 190 to the original position of FIG. 40, ready for the succeeding cycle of operation.

When the reel hubs 19 are loaded into the jig 145, the turn table 140 is rotated through an angle of 90° to bring the jig 145 to the magnetic tape takeup device 143.

The magnetic tape takeup device 143 comprises, as shown in FIG. 45, a magnetic tape guide device 211 for guiding the foremost end of a magnetic tape wound about a magnetic tape reel 210 (FIG. 33) to the jig 145; a magnetic tape-conducting device 212 for transposing the magnetic tape from one reel hub to the other; a pair of magnetic tape-attaching devices 213 for taking up the foreward and rearward end portions of the magnetic tape on the reel hubs 19 respectively; a pair of magnetic tape-cutting devices 214 for cutting off the magnetic tape; and a reel hub-driving device 215 for driving the reel shaft 147 of the jig 145 to wind the magnetic tape about the reel hub 19.

There will first be briefly described by reference to FIGS. 45 and 46A to 46 F the sequential steps of winding a magnetic tape by the magnetic tape-takeup device 143. Then there will be detailed the operation of the above-mentioned devices 211 to 215.

Figure 46A:
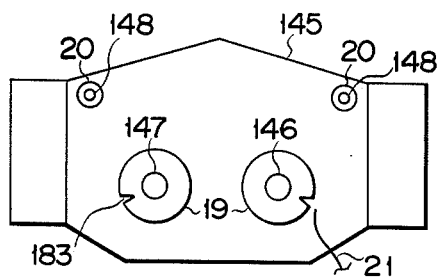
FIGS. 46A to 46F are schematic plan views, showing the sequential steps of inserting a magnetic tape into the magnetic tape takeup jig by means of the magnetic tape takeup device.
Figure 46D:
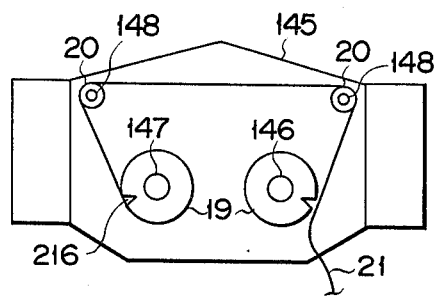
Figure 46B:
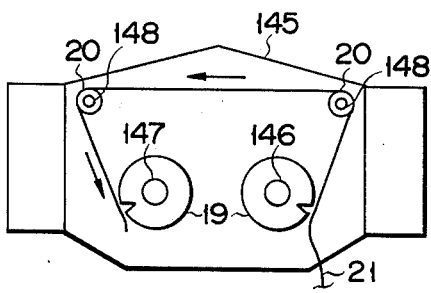
Figure 46E:
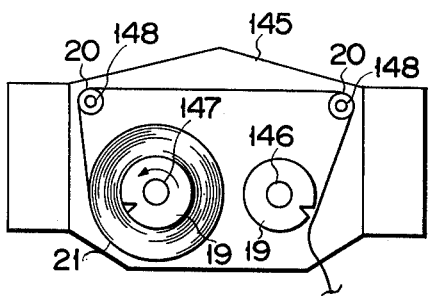
Figure 46C:
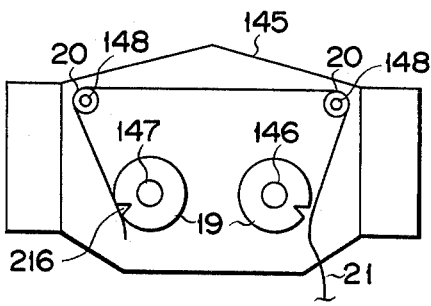
Figure 46F:
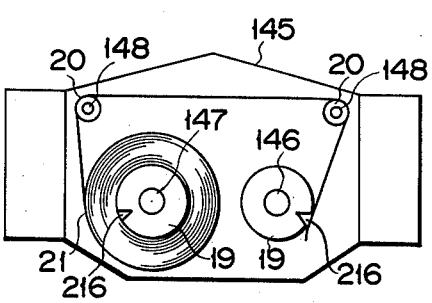

Initially, the jig 145 placed in front of the magnetic tape takeup device 143 maintains the guide rollers 20 and reel hubs 19 in the positions indicated in FIGS. 45 and 46A. Under the condition of FIG. 46A, the magnetic tape takeup grooves 183 of the reel hubs 19 are symmetrically disposed in the opposite directions. At this time the forward end of the magnetic tape 21 is positioned near one of the reel hubs 19 by the magnetic tape guide device 11. Thereafter the magnetic tape 21 is made to pass by the magnetic tape-conducting device 212, as shown in FIG. 46B, around one reel hub 19, guide rollers 20 and the other reel hub 19. The forward end portion of the conducted magnetic tape 21 is securely fixed to the other reel hub 19 by means of an engagement pin 216 inserted into the magnetic tape takeup groove 183 from one magnetic tape takeup device 213 (FIGS. 45 and 46C). The forward end portion of the conducted magnetic tape 21 is tightly stretched between the engagement pin 216 and magnetic tape conducting device 212 (FIG. 45). The excess forward end portion of the magnetic tape 21 is cut off by one tape-cutting device 214 now approaching said forward end portion (FIGS. 45 and 46D). Then, the reel hub-driving device 215 engages the reel shaft 147 of the jig 145 to rotate the other reel hub 19, winding a prescribed amount of magnetic tape 21 about said other reel hub 19 (FIG. 46E). Later, as in the other reel hub 19, the engagement pin 217 is inserted into the magnetic tape takeup groove of said one reel hub 19 from the other magnetic tape takeup device 213 to fix the rear end portion of the magnetic tape 21 to said one reel hub 19 (FIG. 46F). Then, the magnetic tape 21 is tightly stretched between the engagement pin of said one reel hub 19 and magnetic tape guide device 211. The excess rear end portion of the conducted magnetic tape 21 is cut off by the other magnetic tape-cutting device 214 now approaching said rear end portion. When the succeeding jig 145 is brought in front of the magnetic tape takeup device 143, then the magnetic tape conducting device 212 catches the forward end portion of the magnetic tape, and the magnetic tape takeup device 143 repeats the aforesaid cycle of operation.

Figure 47:
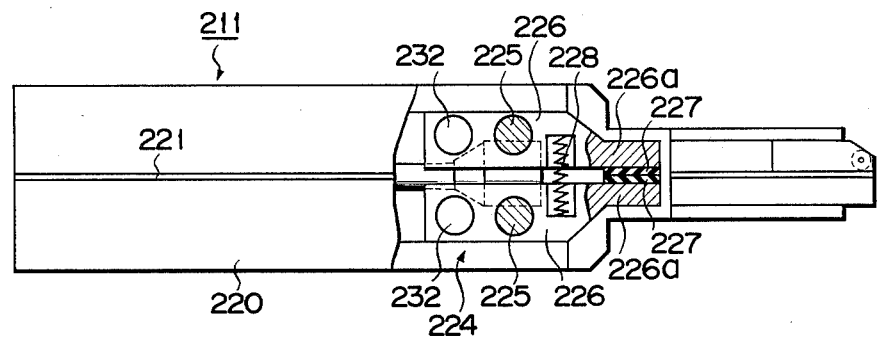
FIGS. 47, 48 are respectively a plan view and longitudinal sectional view of a magnetic tape guide means of the magnetic tape takeup device.
Figure 48:
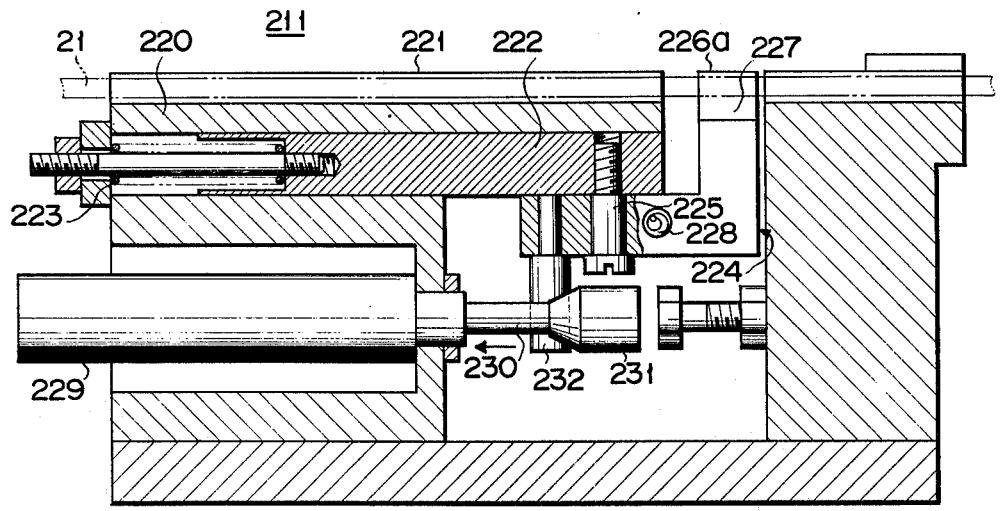

The magnetic tape guide device 211 comprises a body 220, as shown in FIGS. 47 and 48. The upper surface of the body 220 is bored with a guide slit 221 for horizontally conducting the magnetic tape 21 from the reel 210 (FIG. 33) to the proximity of one reel hub 19 engaging the reel shaft 146 of the jig 145. A movable member 222 is disposed below the slit so as to move horizontally relative to the body 220, and normally urged toward the right side of FIG. 48 by a compression spring 223. The forward end of the movable member 222 is fitted with a clamping member 224 which consists of a pair of clamping halves 226 pivotally fitted to the movable member 222 by pins 225. The forward end portions of the clamping halves 226 project upward to the height of the slit 221 to constitute jaws 226a. The jaws 226a have the mutually facing planes fitted with a rubber sheet 227 and are normally so urged as to be spaced from each other by a compressing spring 228. The body 220 has an air cylider 229 provided below the movable member 222. The forward end of a rod 230 of the air cylinder 229 is fitted with a truncated round conical wedge member 231 whose apical plane is directed to said forward end.

A pair of engagement pins 232 project downward from the underside of the damping halves 226 of the clamping member 225 to clamp both sides of the air cylinder rod 230.

Normally, the magnetic type 21 is used freely to travel through the slit 221 and the space between the sheet 227 and held by a magnetic tape conducting device 212 (FIG. 49B) at the forward end of the magnetic tape guide device 221 (the right side of FIG. 48). Where the air cylinder 229 pulls the rod 230 and wedge member 231 jointly toward the left side of FIG. 48 in order to tightly tension the magnetic tape 21 before its excess end portion is cut off as shown in FIG. 46E, then the wedge member 231 pushes the engagement pins 232 outward widely apart from each other, thereby closing the jaws 226a. At this time, the clamping member 224 and movable member 222 are jointly moved to the left side of FIG. 48 against the force of the spring 223. As the result, the magnetic tape 21 is pulled leftward while being held by the jaws 226a to be tightly tensioned between the jaws 226a and engagement pin 216 (FIG. 46D). After the excess end portion of the magnetic tape 21 is cut off, the air cylinder 229 is operated to retract the rod 230 to the right to release the magnetic tape 21.

As shown in FIGS. 49A to 53, the magnetic tape-conducting device 212 comprises a cylindrical fixed body 235; a cylindrical block 236 rotatably mounted on the upper end of the cylindrical body 235 and provided with splines on the inner wall; a splined shaft 237 fitted into the cylindrical block 236 in a state vertically movable but incapable of rotation; and an air cylinder 239 which is received in the cylindrical body 235 and whose rod 238 is connected at the top to the splined shaft 237. Fixed to the upper end of the splined shaft 237 is a support member 241 having a cylindrical support section 240. The support member 241 is normally urged upward by a compression spring 242. A rod 243 is slidably fitted into the cylindrical support section 240. The outer end of the rod 243 is fitted with a support block 244. A substantially cylindrical clamping member 245 is rotatably mounted on the support block 244. A pair of clamping arms 247 are fitted to the lower end of the clamping member 245 by means of pivots 246. The clamping arms 247 are normally so urged by a compression spring 248 as to be spaced from each other, and each provided with an inclined cam surface 249 at the upper end. The clamping member 245 comprises an air cylinder 250, whose rod 251 extends downward and has its lower end provided with a conical wedge member 252. The conical wedge member 252 engages the inclined cam surface 249 of the clamping arms 247 when the air cylinder 250 is operated so as to close the clamping arms 247. A link mechanism 253 is fixed at one end to the upper end of the clamping member 245, and at the other end pivotally fitted to the upper end of the support member 241. Tension springs 256 having the same spring force are stretched between pins 254 fitted to the link 253 and rods 255 projectively formed on the body 235. The support member 241 further comprises an air cylinder 257, whose rod 258 is fitted to the rod 243 to move it in the axial direction. A bracket 259 mounted on the fixed body 235 is provided with another swingable air cylinder 260. A rod 261 of the air cylinder 260 is fixed to a plate 262 attached to the rotatable block 236.

When actuated by the air cylinders 257, 260, the clamping member 245 is successively carried to points a, b, c and d (FIG. 49A) corresponding to the reel shaft 146, roller shaft 148 and reel shaft 147 of the jig 145 (FIG. 34).

There will now be described by reference to FIGS. 50 to 53 the operation of the magnetic tape-conducting device 212. Initially, the splined shaft 237 is in a rising position to hold up the clamping member 245. Since, at this time, the rod 258 of the air cylinder 257 is retracted and the rod 261 of the air cylinder 260 extends outward, the link 253 is bent in the L-shape, causing the clamping member 245 to occupy the position a (FIG. 49A) as illustrated in FIG. 50. When the air cylinder 239 is operated to bring down the splined shaft 237, the clamping member 245 falls down to the forward end of the magnetic tape guide device 211 (FIG. 47). When the air cylinder 250 is operated, the clamping arms 247 hold the forward end of the magnetic tape 21. When the rod 258 of the cylinder 257 is pushed, the link 253 is made straight, bringing the clamping member 245 to the position b of FIG. 49A as illustrated in FIG. 51. When the piston rod 261 of the cylinder 260 is retracted, the support member 241 and clamping member 245 jointly rotate. Said clamping member 245 reaches the position c of FIG. 49A as indicated in FIG. 52. Finally when the rod 258 of the air cylinder 257 is pulled in, the link 253 is again bent in the L-shape, bringing the clamping member 245 to the position d of FIG. 49A as shown in FIG. 53. When the clamping member 245 traces the chain line focus of FIG. 49A extending from the position a to the position d, then the magnetic tape 21 passes around the reel hubs 19 and guide rrollers 20 held by the jig 145, presenting a state shown in FIG. 46B. When the excess forward end portion of the magnetic tape 21 is fully cut off (FIG. 46D), the clamping member 245 is moved up and brought back to the original position (FIG. 51) by the action of the air cylinder 260.

Figure 54:
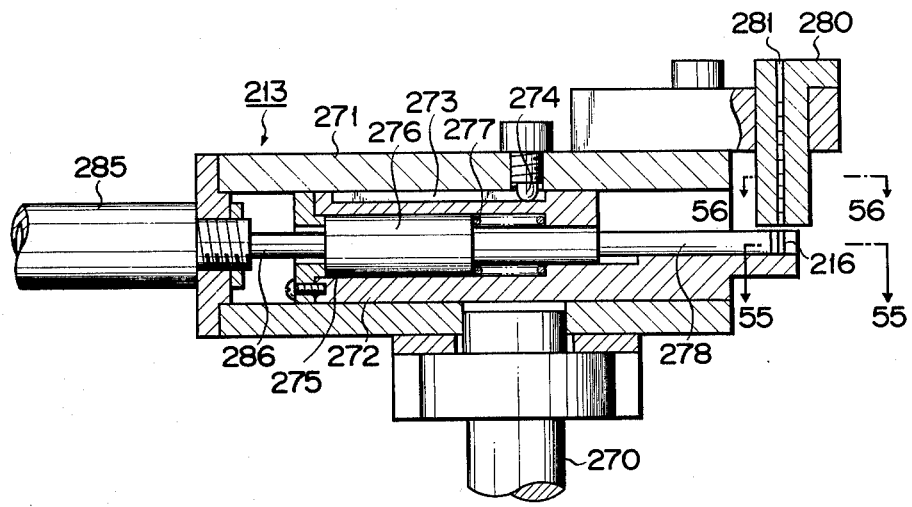
FIG. 54 is a longitudinal sectional view of a magnetic tape-fitting means of the magnetic tape takeup device.
Figure 55:
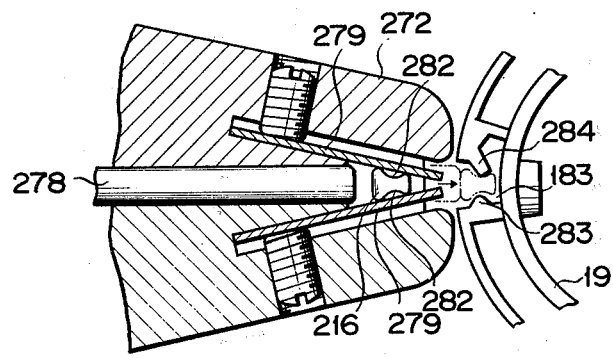
FIGS. 55, 56 are cross sectional views on lines 55—55 and 56—56 of FIG. 54.
Figure 56:
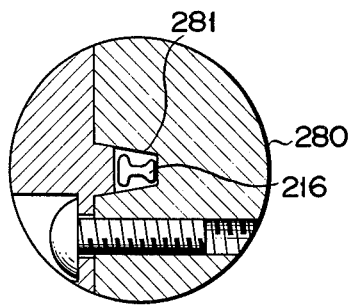

As shown in FIGS. 54 to 56, the magnetic tape takeup device 213 comprises a cylindrical support block 271 fixed to the upper end of a stationary support rod 270 and a movable member 272 received in the support block 271 as to slide therethrough horizontally. The movable member 272 has a guide keyway 273 formed in the upper surface. Fitted into the keyway 273 is a key 274 which prevents the movable member 272 from being rotated and restricts the horizontal stroke of the movable member 272 to a prescribed extent. The movable member 272 has a hollow cavity 275 in which a push rod 276 is slidably received. The rear end of the support block 271 is fitted with an air cylinder 285, whose piston rod 286 penetrates the rear end of the movable member 272 and is fixed to the push rod 276. The push rod 276 is normally urged by a compression spring 277 toward the rear side of the movable member 272, and comprises an extension rod 278 which reaches the proximity of the forward end of the movable member 272. The forward end of the movable member 272 is provided with a pair of leaf springs 279 jointly defining a V-shape. Allowed between said paired leaf spring 279 is a free space to receive the engagement pin 216. Disposed above said space is a vertical pin magazine 280 fixed to the support block 271. The pin magazine 280 comprises a pin receptacle 281 having a substantially trapezoidal cross section. The trapezoidal pin receptacle 281 contains a large number of engagement pins 216 arranged one atop another. Three engagement pins 216 gravitationally full one by one into the space provided between the paired leaf springs 279.

Each engagement pin 216 has, as shown in FIG. 55, a substantially T-shaped cross section and a pair of curved depressions 282 formed on both sides. The fitting groove 183 formed in the periphery of the reel hub 19 is fringed by a projection 283 and elastic tongue member 284.

After the magnetic tape 21 is conducted, as shown in FIG. 46B, around the reel hubs 19 and guide rollers 20, the air cylinder 285 of one of the magnetic tape takeup devices 213 is operated to move the push rod 276 to the right side of FIG. 54. At this time, the movable member 272 and push rod 276 are jointly move by the force of the compression spring 277, bringing the engagement pin 216 to the proximity of the reel hub 19. When the forward end of the movable member 272 closely approaches the reel hub 19, then the key 274 strikes against one end wall of the key way 273 to bring the movable member 272 to rest. On the other hand, the push rod 276 is carried further forward while depressing the compression spring 277. As the result, the extension rod 278 of the push rod 276 moves forward relative to the movable member 272 to insert the engagement pin 216 held between the leaf springs 279 into the fitting groove 183 of the reel hub 19. The engagement pin 216 is tightly inserted into the fitting groove 183 (as shown in chain lines in FIG. 55) by engagement between the curved depressions 282 of said engagement pin 216 and the aforesaid projection 283 and tongue member 284, thereby taking up the magnetic tape 21 on the reel hub 19. When the rod 286 of the air cylinder 285 is retracted, the push rod 276 and the movable member 272 are brought back to the position shown in FIG. 54, causing the engagement in 216 to fall into the space between the leaf springs 279.

When the magnetic tape 21 is wound about one of the reel hubs 19 as shown in FIG. 46E, the other magnetic tape takeup device 213 is actuated to attach the rear end portion of the magnetic tape 21 to the other reel hub 19.

Figure 57:
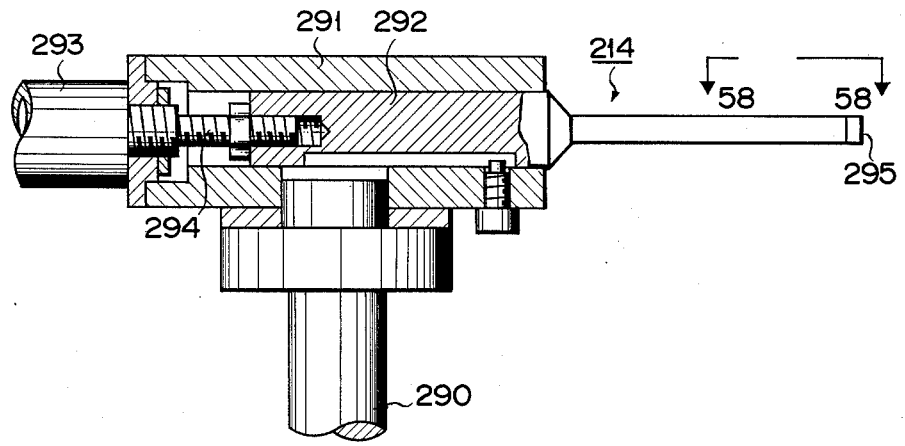
FIG. 57 is a longitudinal sectional view of a magnetic tape-cutting means of the magnetic tape takeup device.
Figure 58:
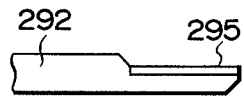
FIG. 58 is a plan view of the magnetic tape cutting means as taken from line 58—58 of FIG. 57.

The magnetic tape-cutting device comprises, as shown in FIGS. 57 and 58, a cylindrical support block 291 fixed to a support shaft 290 and a cutter rod 292 received in the support block 291 in a state horizontally slidable but incapable of being rotated. The rear end of the support block 291 is fitted with an air cylinder 293.

The forward end of a piston rod 294 of said air cylinder 293 is fixed to the cutter rod 292. The forward end of the cutter rod 292 is fitted with a sharp cutter blade 295, as shown in FIG. 58.

When the forward end portion of the magnetic tape 21 is fixed to the reel hub 19 as shown in FIG. 46C, said end portion is tightly stretched between the engagement pin and the magnetic tape-conducting device 212. At this time, the air cylinder 293 of one of the magnetic tape-cutting device 214 is operated to move the cutter rod 292 to the right side of FIG. 57. The cutter blade 295 is pressed against the excess forward end portion of the magnetic tape 21 to cut it off. Later, the rod 294 of the air cylinder 293 is retracted to bring the cutter rod 292 to the original position.

When the rear end portion of the magnetic tape 21 is fitted to the other reel hub 19 as shown in FIG. 46E, then the clamping member 224 (FIG. 47) of the magnetic tape guide device 211 is actuated to cause the rear end portion of the magnetic tape 21 to be tightly stretched between the engagement pin 216 and clamping member 224 of the tape guide device 211. At this time, the other magnetic tape cutting device 214 is operated to cut off the excess rear end portion of the magnetic tape 21.

Figure 59:
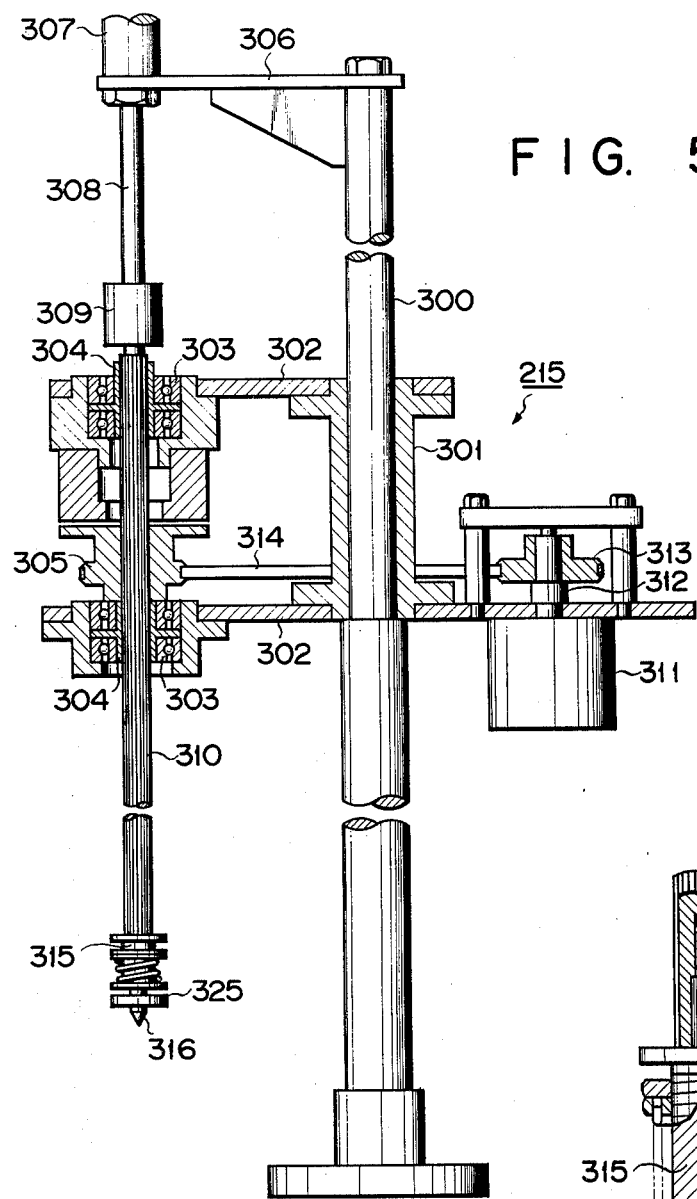
FIG. 59 is a longitudinal sectional view of a reel hub driving means of the magnetic tape takeup device.
Figure 60:
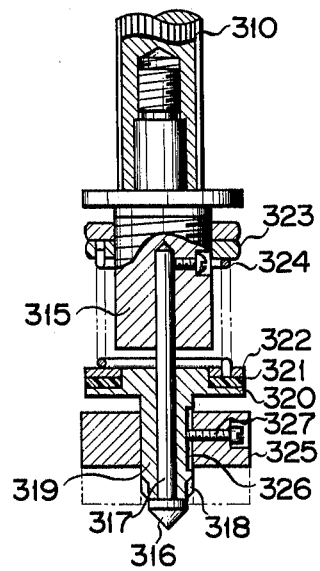
FIG. 60 is an enlarged cross sectional view of a driving pivot of the reel hub driving means.
Figure 61:
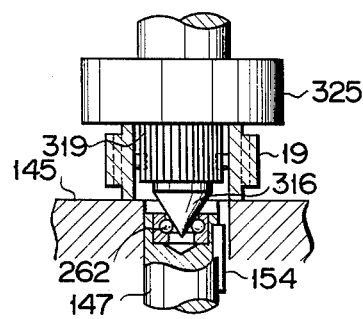
FIG. 61 is an enlarged cross sectional view of the driving pivot of the reel hub driving means in which the driving pivot is engaged with the reel hub.

The reel hub-driving device 215 comprises, as indicated in FIGS. 59-61, a sleeve 301 fixed to the intermediate part of a support shaft 300 and a pair of vertically spaced support arms 302. Each support arm 302 has a pair of ball bearings 303, whose inner race 304 has splines formed inside. A pulley 305 is rotatably held between both bearings 303, and also provided with splines inside. A bracket 306 mounted on the upper end of the support shaft 300 is fitted with an air cylinder 307, the lower end of a piston rod 308 of the air cylinder 307 holds a splined shaft 310 by means of a joint member 309. The joint member 309 allows the relative rotation of the piston rod 308 and splined shaft 310. The splined shaft 310 extends vertically downward from the joint member 309 and vertically slide through the inner race 304 of the paired bearings 303 and pulley 305. The splined shaft 310 is concentrically arranged with the reel shaft 147 of the jig 145 (FIGS. 34 and 35). The lower support arm 302 is provided with a motor 311. A drive shaft 302 of the motor 311 has a pulley 313. An endless belt 314 is stretched between the pulleys 305 and 313.

A male-threaded cylindrical block 315 is fixed to the lower end of the splined shaft 310. The cylindrical block 315 comprises a spindle 317 whose lower end constitutes an inverted conical section 316. A drive pivot 319 whose lower periphery is provided with a large number of engagement projections 318 is rotatably and slidably engaged with the spindle 317 and supported on a shoulder portion of the conical section 316. A flange 320 is integrally formed with the upper end of the pivot 319. A fluoride resin ring 321 and oilless bearing ring 322 are mounted on the flange 320. An adjustment nut 323 is threadedly engaged with the male threaded block 315. A compression spring 324 is stretched between the nut 323 and ring 322. When the splined shaft 310 rotates, the pivot 319 normally rotates together with the block 315 and consequently with said shaft 310 by the urging force of the compression spring 324 and friction occurring between the flange 320 and rings 321, 322. Where, however, a stronger brake force than prescribed is applied to the pivot 319, the pivot 319 stops rotation due to the mutual slip of the flange 320 and ring 321 as well as of the rings 321, 322 themselves. A reel hub-keeping ring 325 of prescribed weight slidably engages the upper part of the pivot 319. A key 327 of the ring 325 is slidably fitted into a longitudinal keyway 326 formed in the periphery of the pivot 319. Normally the reel hub-keeping ring 325 is gravitationally brought down to the chain line position of FIG. 60.

After, as shown in FIG. 46D, the magnetic tape 21 is taken up on the reel hub 19 engaging the reel shaft 147 and the excess forward end portion of said megnatic tape 21 is cut off, the air cylinder 307 of the reel hub driving device 215 is operated to bring the splined shaft 310 straight downward. At this time, the lower end 316 of the spindle 317 abuts against the ball bearing 162 of the reel shaft 147 of the jig 145 to force down the reel shaft 147 together with the key 154, and the engagement projections 318 of the pivot 319 are inserted into the interspaces between the projections 19a of the reel hub 19. As the result, the reel hub 19 is released from the locking of the key 154, and brought to a state ready to be driven by the pivot 319. The reel hub-keeping ring 325 gravitationally presses the reel hub 19 from above (FIG. 61). The lock bar 160 (FIG. 35) is carried into the jig 145 by the spring 159 to lock the sleeve 156, together with the key 154, at a fallen position. When the motor 311 is driven to operate the pulley 305 by means of the belt 314, then the splined shaft 310 rotates the pivot 319 to wind the magnetic tape 21 about the reel hub 19. The motor 311 is fitted with a known electric control device (not shown) for driving the motor 311 only for a specified length of time in order to fix the length of the magnetic tape taken up on the reel hub 19. Where the magnetic tape 21 is unexpectedly subjected to any external force while being wound about the reel hub 19, then a slip occurs between the flange 320 and ring 321 as well as between the rings 321, 322 themselves to stop the rotation of the pivot 319.

When a prescribed amount of magnetic tape is wound about the reel hub 19 (FIG. 46E), the motor 311 stops. The air cylinder 307 is operated to lift the splined shaft 310. The reel shaft 147 of the jig 145 is moved upward by the spring 149 (FIG. 35) to be again engaged with the reel hub 19. At this time, the lever 161 (FIG. 35) may be actuated by a device (not shown) to pull the lock bar 160, thereby bringing the sleeve 156 and key 154 back to the original position. Or it is possible, as later described, to operate the lever 161 after the reel hub 19 and magnetic tape 21 are transferred from the magnetic tape taking jig 145 to the transport jig 32. In the latter case, the key 154 is prevented from unexpectedly pushing up the projection 19a of the reel hub 19 when said key 154 is lifted.

Figure 62:
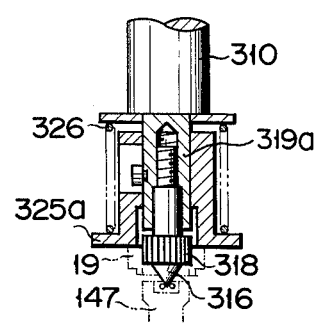
FIG. 62 is a cross sectional view of a modification of a reel-hub-keeping ring of the reel hub driving means.
Figure 63:
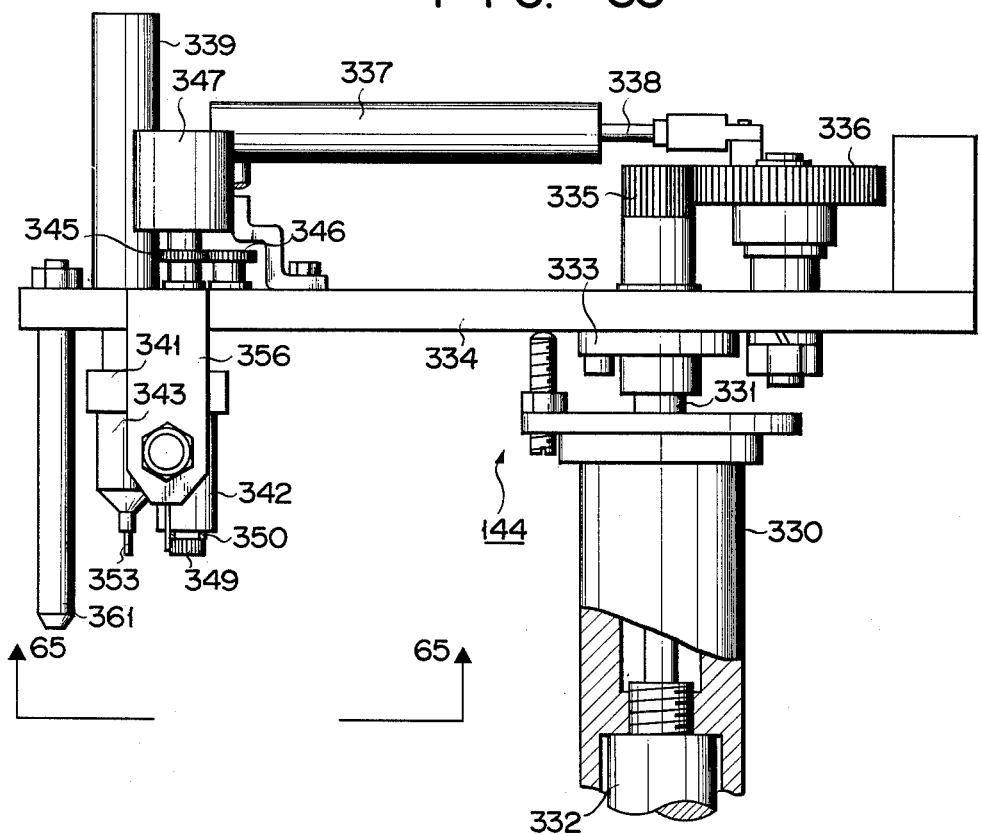
FIGS. 63, 64 are respectively a side elevation and plan view of a magnetic tape-transferring means of the magnetic tape takeup device.
Figure 64:
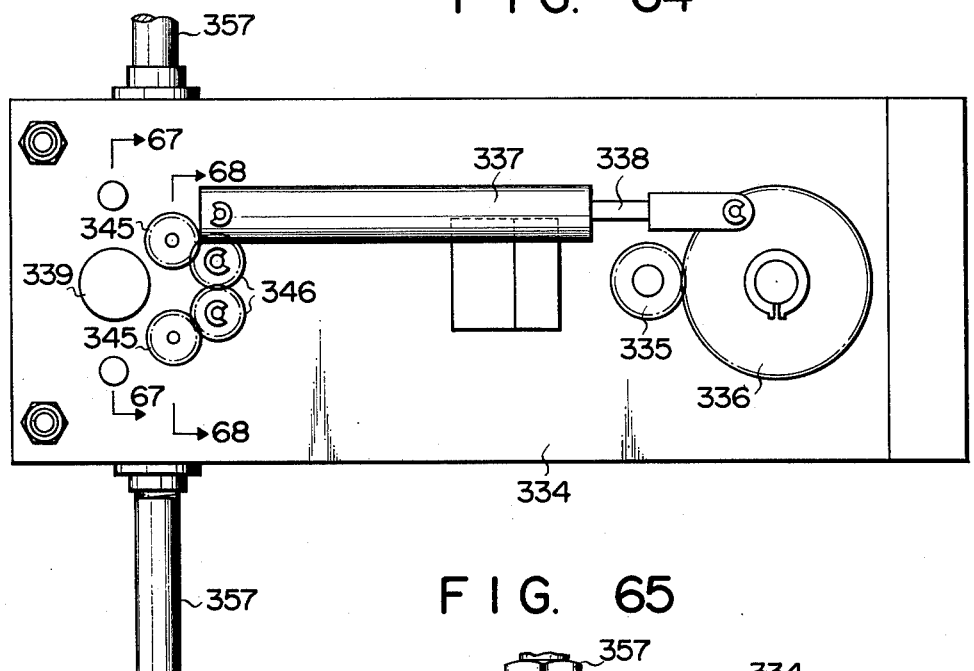

FIG. 62 shows a modification of the reel hub-keeping ring 325. The reel hub-keeping ring 325a of FIG. 62 is fitted to the pivot 319a so as to vertically slide thereon, and normally urged downward by a compression spring 328. The ring 325a presses the reel hub 19 from above mainly by the urging force of the compression spring 328 when the ring 325a abuts against the reel hub 19.

When the magnetic tape 21 is wound about the reel hubs 19 of the magnetic tape takeup jig 145 by the magnetic tape takeup device 143 as shown in FIG. 46F, then the turn table 140 (FIG. 33) rotates through an angle of 90° to bring the magnetic tape takeup jig 145 to the magnetic tape-transferring device 144.

The magnetic tape-transferring device 144 comprises, as shown in FIGS. 63 to 68, a support rod 331 fitted to a substantially cylindrical hollow support pillar 330 in a state vertically movable therethrough, but incapable of being rotated, an air cylinder 322 used for the vertical movement of the support rod 331, and a plate 334 made rotatable about the axis of the rod 331 on a bearing ring 333.

The support rod 331 rotatably penetrates the rotatable plate 334 and has a small gear 335 provided at the upper end. This small gear 335 engages a master gear 336 pivotally supported above the rotatable plate 334. The master gear 336 is fitted with a rod 338 of an air cylinder 337 provided above the rotatable plate 334. The rod 338 projects from the air cylinder 337 when it is operated, thereby causing the master gear 336 to turn around the small gear 335 in close engagement therewith. As the result, the rotatable plate 334 rotates about the support rod 331 through a prescribed angle of, for example, 180°. An air cylinder 339 is provided above the left end of the rotatable plate 334. A piston rod 340 of the air cylinder 339 slidably penetrates the rotatable plate 334 in a vertical direction (FIG. 57). The lower end of the piston rod 340 is fitted with a vertically movable plate 341, which, upon actuation of the rod 340, is brought down for a specified distance from the rotatable plate 334. The vertically movable plate 341 is provided with a pair of reel hub-depressing sleeves 342 (FIG. 68) and a pair of guide roller-depressing sleeves 343 (FIG. 67). A pair of rods 344 are rotatably and slidably fitted into the paired reel hub-depressing sleeves 342 respectively. The upper end of each rod 344 is fitted to the rotatable plate 334 in a state rotatable but incapable of being brought down. A small gear 345 is fitted to the upper end of each rod 344 projecting above the rotatable plate 334. Both gears 345 are coupled together by an intervening pair of mutually engaged small gears 346. These two groups of small gears 345, 346 have the same number of teeth and module. One of the small gears 345 is fitted with a drive shaft of a torque motor 347, which is designed to be driven idly when the drive shaft is subjected to a stronger brake force than specified. The lower end of each rod 344 is provided with a reel hub holder 349 formed with engagement projections 348 introducible into the interspaces between the projections 19a of the reel hub 19. A deformable O-ring 350 is disposed on the reel hub holder 349. A cylindrical hollow cavity 351 (FIG. 67) is formed in the respective guide roller depressing sleeves 343. A cylindrical block 352 is slidably fitted into said cavity 351. The block 352 has an integral roller-supporting pin 353 projecting downward from the lower end of the guide roller-depressing sleeve 343. The pin 353 is normally urged downward by a compression spring 354.

Figure 65:
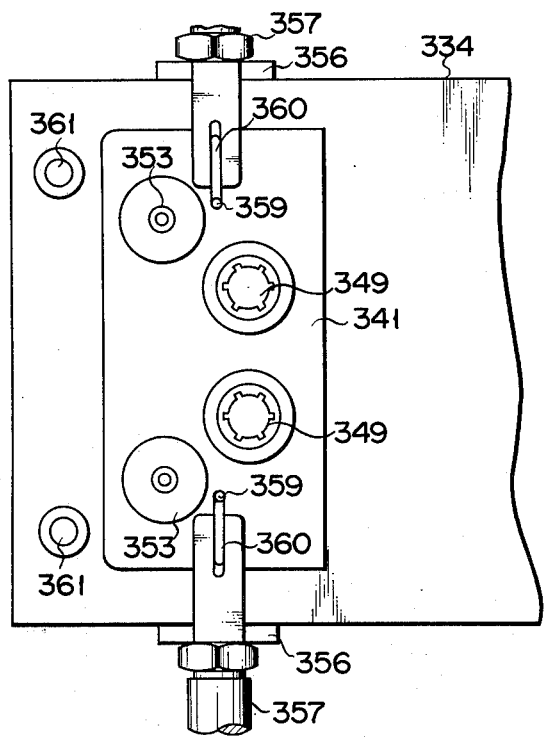
FIG. 65 is a bottom view of the magnetic tape-transferring means as taken from line 65—65 of FIG. 63.
Figure 66:
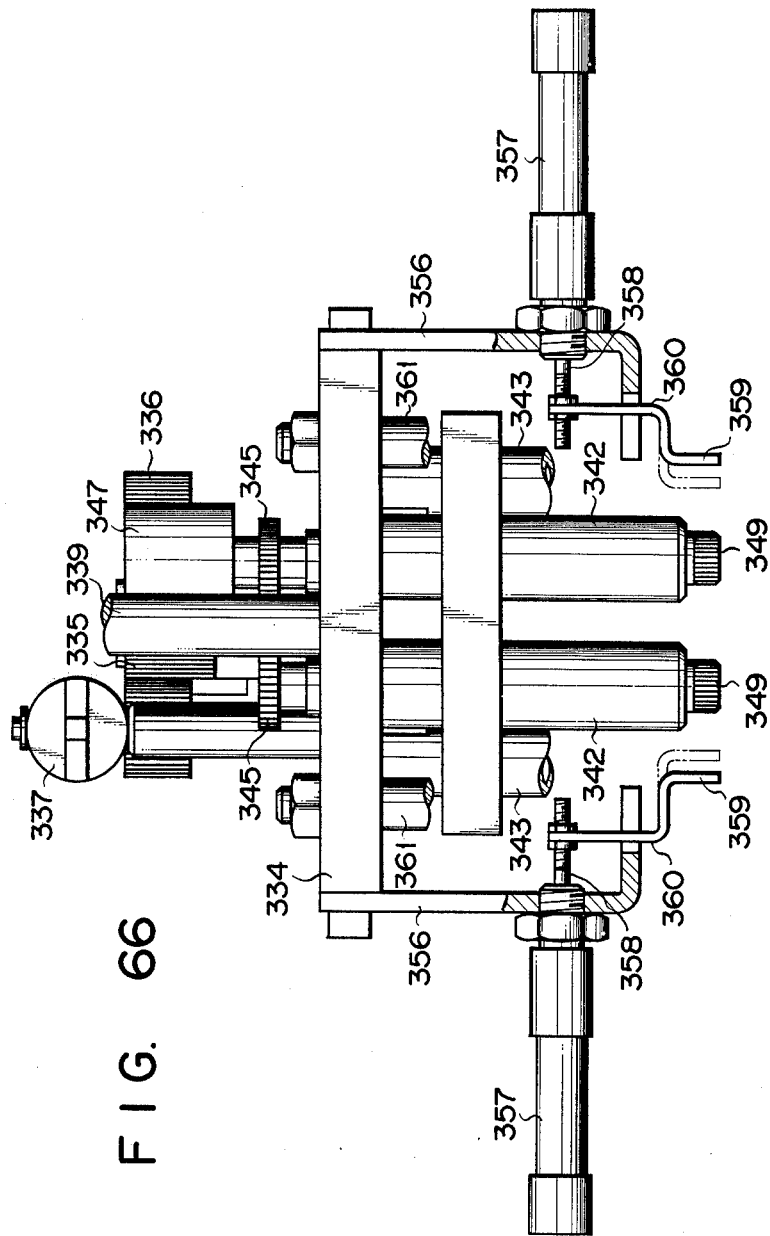
FIG. 66 is a side elevation of the magnetic tape-transferring means as viewed from the left side of FIG. 63.
Figure 70:
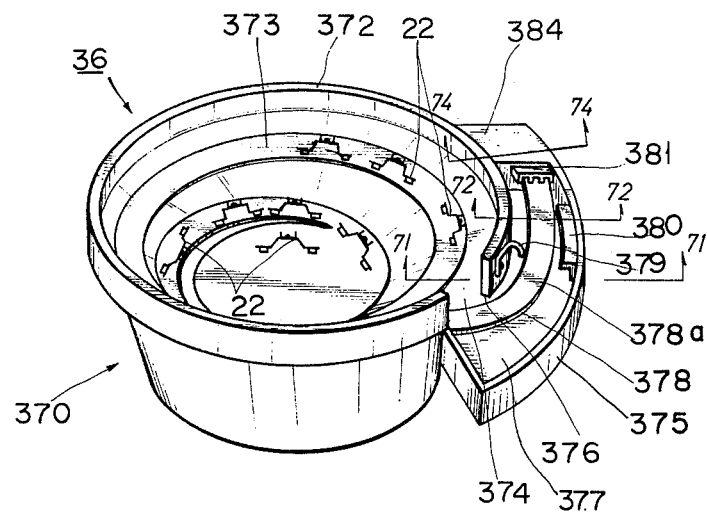
FIG. 70 is an oblique view of a pud spring-sorting mechanism of a pad spring feeder.
Figure 71:
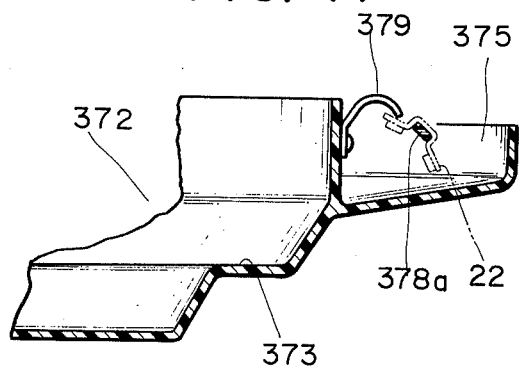
FIGS. 71, 72 are cross sectional views of the pad spring-sorting mechanism on lines 71—71 and 72—72 of FIG. 70 respectively.
Figure 72:
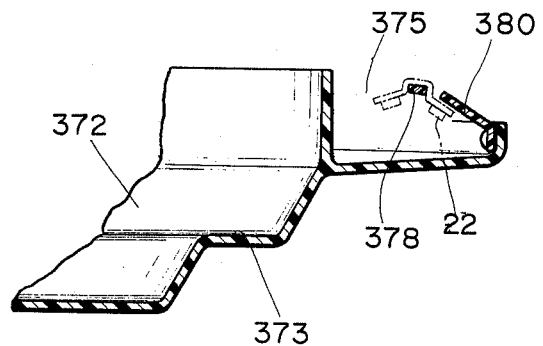
Figure 73:
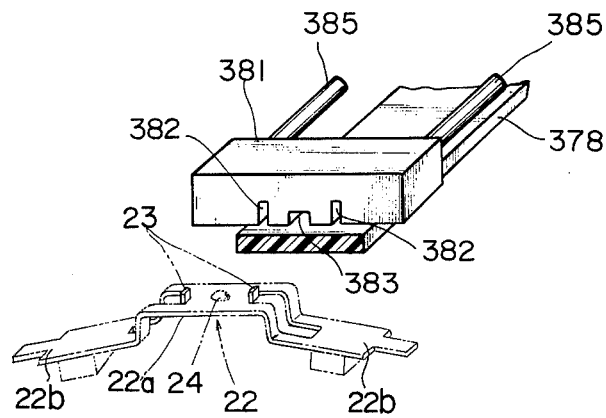
FIG. 73 is an enlarged oblique view of a third sorting member of the pad spring-sorting mechanism.

Both sides of the rotatable plate 334 are fitted with a pair of downward extending brackets 356 (FIGS. 65 and 66). Each bracket 356 has an air cylinder 357 horizontally fitted to the outer wall. A piston rod 358 of the air cylinder 357 slidably penetrates the bracket 356. The outer end of the piston rod 358 is provided with a substantially L-shaped magnetic tape tension bar 360 having an engagement projection 359 extending straight downward. Both tension bars 360 are so operated as to be separated from each other when the air cylinders 357 are actuated. Provided near the end portion of the rotatable plate 344 are a pair of locating rods 361 introducible into the locating holes 58 (FIG. 8) of the transport jig 32.

The reel hub holders 349 and roller supporting pins 353 are so disposed as to be positioned corresponding to the reel hubs 19 and guide rollers 20 (FIG. 6) received in the magnetic tape cassette 1. When the air cylinder 357 is operated, the magnetic tape tension bar 360 is brought to a point nearer to the rear part of the magnetic tape cassette 1 than the guide pins 16 (FIG. 6) of said cassette 1.

Figure 33:
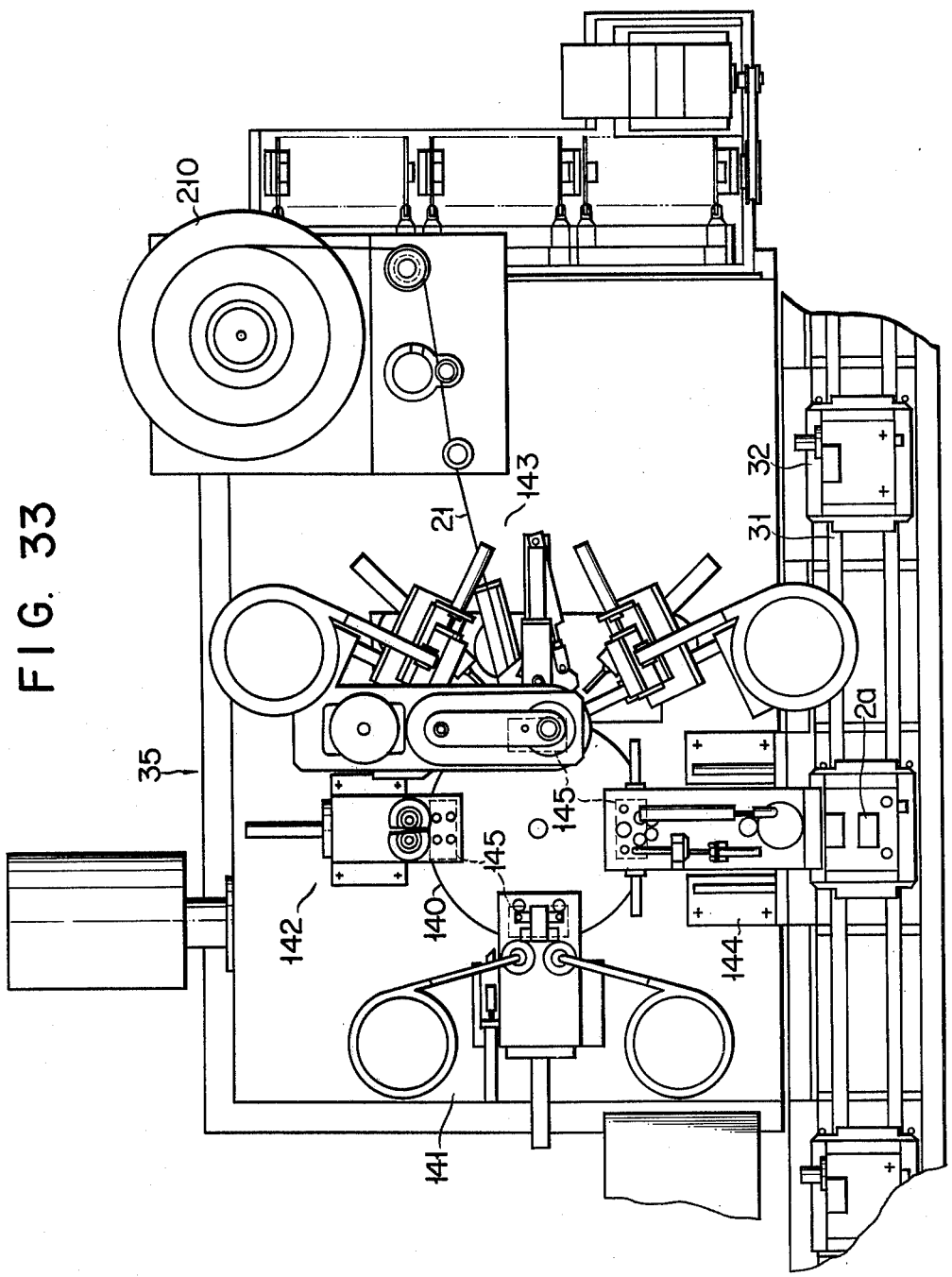
FIG. 33 is a plan view of a magnetic tape-loading mechanism.

When the magnetic tape takeup jig 145 loaded with the reel hubs 19, guide rollers 20 and magnetic tape 21 is brought to the magnetic tape-transferring device 144, then the rotatable plate 334 is in a rising position, causing the reel hub holder 349 and guide roller supporting pins 353 to be disposed right above the magnetic tape takeup jig 145. The transport jig 32 (FIG. 8) which has carried the lower cassette housing half 2a is now brought in front of the magnetic tape-transferring device 144 as shown in FIG. 33. When the transport jig 32 is brought to rest in front of the magnetic tape-transferring device 144 by the stop mechanism 69 (FIGS. 16 to 18), then the piston-cylinder 81 (FIGS. 8 and 9) is operated to push away the rack 56 (FIGS. 10 and 11) of the jig 32 for rotattion of the reel shaft 47. Under this condition, the air cylinder 332 of the magnetic tape transferring device is first actuated to bring down the rotatable plate 334, causing the lower ends of the reel hub holders 349 and the guide roller supporting pins 353 to abut against the upper ends of the reel hub shafts 146, 147 and roller shaft 148 of the magnetic tape takeup jig 145 (FIGS. 35 and 36). When the rotatable plate 334 is further brought down, the reel hub holders 349 and guide roller-supporting pins 353 push the support shafts 146, 147, 148 down into the jig 145. The reel hub holders 349 hold the reel hubs 19 by means of the O-rings 350. At this time, the guide roller supporting pins 353 are inserted into the guide rollers 20. When each air cylinder 357 is operated, the engagement projection 359 of the magnetic tape tension bar 360 pulls the magnetic tape 21 outward as shown in FIG. 69. The torque motor 347 is actuated to rotate the rods 344, until the magnetic tape 21 is stretched between the reel hubs 19 with a prescribed tension. The tension of the magnetic tape 21 enables the guide rollers 20 to be supported by the supporting pins 353. The air cylinder 332 is actuated to lift the rotatable plate 334, and the air cylinder 337 is operated to turn the rotatable plate 334 so as to bring the reel hub holders 349 and guide roller-supporting pins 353 right above the transport jig 32. At this time, the reel hubs 19, guide rollers 20 and magnetic tape 21 are positioned above the lower cassette housing half 2a now placed on the jig 32 while being held by the holder 349, pins 353 and tension bars 360. The air cylinder 332 brings down the rotatable plate 334 until the holders 349 and the lower ends of the pins 353 abut against the upper ends of the reel supporting shafts 47 of the jig 32 and the roller-supporting shafts 12 of the lower cassette housing half 2a. At this time, the locating rods 361 are fitted into the locating holes 58 (FIG. 8) of the jig 32, causing said jig 32 to be exactly aligned with the magnetic tape-transferring device 144. When the air cylinder 339 is operated, the sleeves 342, 343 are brought down to transfer the reel hub 19 and guide rollers 20 from the holders 349 and pins 353 to the support shaft 47 of the jig 32 and the support shaft 12 of the lower cassette housing half 2a. Since, at this time, the magnetic tape 21 is held in a state shown in FIG. 69 by tension arms 360, the magnetic type 21 is brought down on the lower cassette housing half 2a without being obstructed by the various projection formed on said housing half 2a. When the air cylinders 357 are actuated to project the rods 358, the tension arms 360 are drawn to each other to be separated from the magnetic tape 21. Later, the air cylinders 332, 337, 339 are operated to bring the magnetic tape-transferring device 144 back to the original position. At this time, the piston cylinder 81 (FIG. 8) is operated to retract its rod. As the result, the rack 56 (FIG. 10) is driven by the spring 57 to rotate the reel supporting shaft 47 so as to attain the tension of the magnetic tape 21.

After the lower cassette housing half 2a is loaded with the reel hubs 19, guide rollers 20 and magnetic tape 21, the transport jig 32 is carried to the pad spring feeder 36 by the conveyor device 31.

Figure 74:
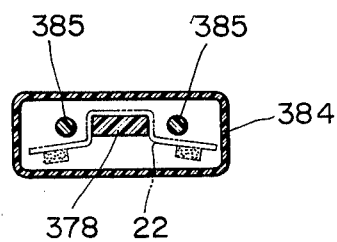
FIG. 74 is a cross sectional view on line 74—74 of FIG. 70.
Figure 75:
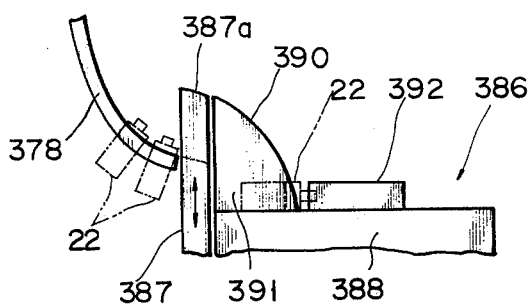
FIG. 75 is a side elevation of a waiting station of the pad spring of the pad spring-sorting mechanism.
Figure 76:
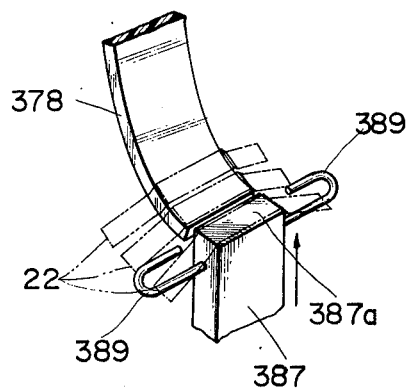
FIGS. 76, 77 are oblique views showing the operating condition of the waiting station of the pad spring.

The pad spring feeder 36 comprises, as indicated in FIGS. 70 to 81, a pad spring-sorting device 370 (FIGS. 70 to 77) and a pad spring-loading device 371 (FIGS. 78 to 81). Like the lower cassette housing half-sorting device 90 (FIG. 19). The pad spring-sorting device 370 comprises a barrel body 372 containing a large number of pad springs 22 and a helical inclined passage 373. When the barrel body 372 is shaken by driving means (not shown), the pad springs are linearly moved up the inclined passage 373 to an outlet 374. A pad spring receptacle 375 is provided on the upper outside of the barrel body 372. The receptacle 375 has an opening 376 communicating with the interior of the barrel body 372 and comprises an inclined bottom section 377. A band-shaped guide rail 378 constituting from the inclined passage 373 is positioned above the pad spring receptacle 375. The guide rail 378 has a width substantially equal to that of the U-shaped central portion 22a (FIG. 5) of the pad spring 22. The guide rail 378 lies substantially horizontal in the proximity of the outlet 374 and then is gradually turned downward from side to side beyond the outlet 374. The most sharply inclined portion of the guide rail 378 defines an angle of substantially 45° to the horizontal portion thereof. The barrel body 372 comprises a first pad spring-sorting member 379 (FIG. 71) formed of a wire spring and disposed near the most shaply inclined portion 378a. One of the spring arms 22b of the normally positioned pad spring 22 passes below the pad spring-sorting member 379. The portion of the guide rail 378 which lies beyond the most sharply inclined portion 378a is again made substantially horizontal. The pad spring receptacle 375 is provided with a second plate-like pad spring-sorting member 380 (FIG. 72) disposed apart from the first pad spring-sorting member 379. The other spring arm 22b of the normally positioned pad spring 22 passes below the second pad spring-sorting member 380. A third block-like pad spring-sorting member 381 (FIG. 73) is provided slightly above the guide rail 378 at a point apart from the second pad-spring sorting member 380. The third pad spring-sorting member 381 is formed at its lower side with a pair of first grooves 382 and a second groove 383 which respectively allow the projections 323 and 324 of the pad spring to pass therealong. That portion of the guide rail 378 which lies apart from the thrid pad spring-sorting member 381 is enwrapped with a transparent plastics cover 384 (FIG. 74). Received in this cover 384 are a pair of restraining rods 385 (FIG. 74) to prevent the pad spring 22 from jumping up. The guide rail 378 is sharply inclined downward at the terminal section (FIG. 75). A pad spring waiting station 386 (FIGS. 75 and 77) is disposed near said terminal section. The pad spring waiting station 386 comprises a plate 387 moved vertically by means (not shown) and a table 388 for keeping a pad spring 22 in a waiting position. The plate 387 is located in front of the terminal section of the guide rail 378 and is made to move vertically between a level (FIG. 76) below the upper surface of the terminal section of the guide rail 378 and a level (FIG. 77) higher than said upper surface. The upper surface 387a of the plate 387 is inclined downward. Both crosswise opposite side walls of the plate 387 are provided with a pair of U-shaped straining wires 389 for preventing the pad spring from jumping up. A pair of upright guide plates 391 having a curved slip plane 390 are erected on the upper surface of the table 388. Both outer walls of said guide plates 391 are arranged parallel to each other and the interspace therebetween has a width substantially equal to that of the U-shaped central portion 22a of the pad spring 22. A support block 392 is placed on the table 388 at a slight distance from the guide plates 391. This support block 392 has a width substantially equal to a distance between the projections 23 (FIG. 73) of the pad spring 22.

Figure 77:
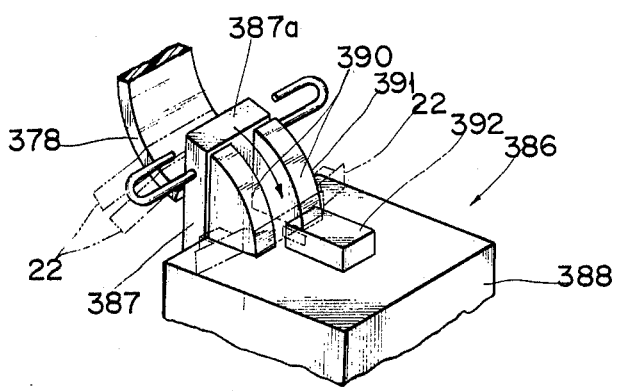
Figure 78:
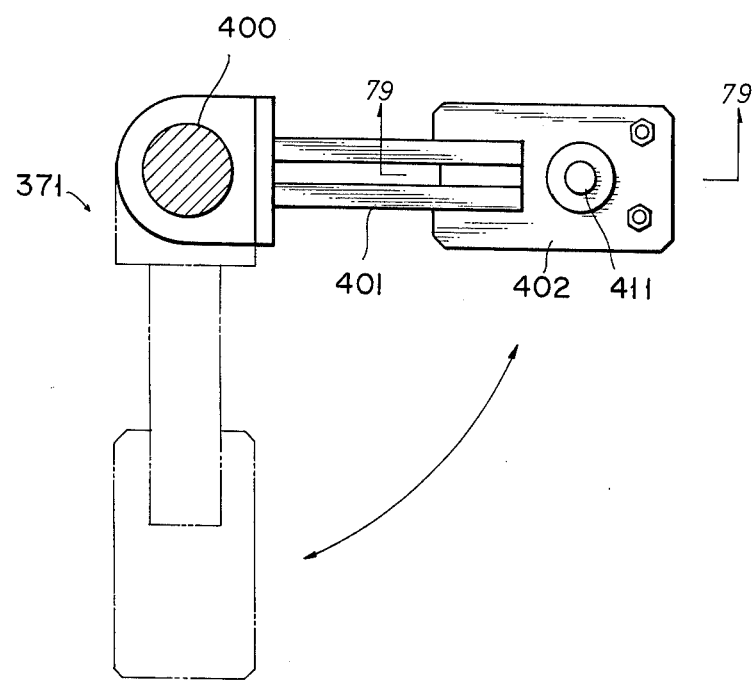
FIG. 78 is a plan view of a pad spring-fitting means of the pad spring feeder.
Figure 79:
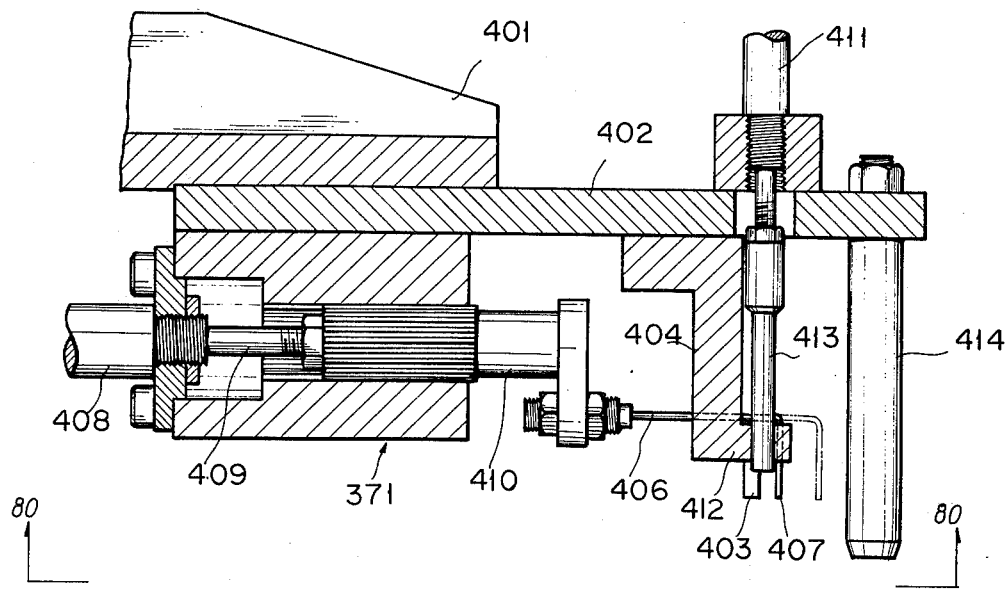
FIG. 79 is a cross sectional view on line 79—79 of FIG. 78.

There will now be described the operation of the pad spring-sorting device 370. A plurality of pad springs 22 slowly move up the helical inclined passage of the barrel body 372 until they reach the guide rail 378. At this time, only that of the pad springs 22 whose U-shaped central portion 22a bridges the guide rail 378 securely rides thereon. The other pad springs 22 either fail to ride on the guide rail 378 or fall into the receptacle 375 due to the inclination of the guide rail 378, even if temporarily riding on the guide rail 378. The first pad spring-sorting member 379 throws into the receptacle 375 a pad spring bridging the guide rail 378 under a defective condition or another pad spring whose arms 22b are deformed. The second pad spring-sorting member 380 throws into the receptacle 375 a pad spring whose arms 22b are deformed. Finally, the third pad spring-sorting member 381 throws into the receptacle 375 a pad spring whose projections 23, 24 are deformed. Thus, only pad springs 22 having a normal shape and kept in a normal condition successively slip over the terminal section of the guide rail 378 and are brought in front of the pad spring waiting station 386. When the foremost pad spring 22 rides on the upper surface of the upright guide plates 387 occupying a position shown in FIG. 76 (in which the table 388 is omitted), then the guide plates 387 are moved up to lift the pad spring 22, which in turn falls down the slip surfaces of the guide plates 391 to be brought into an interspace between the guide plates 391 and block 392 (FIG. 77). Thereafter, the vertically movable plate 387 is brought down to receive the succeeding pad spring 22 on the surface.

The pad spring loading device 371 comprises, as shown in FIGS. 78 to 81, an arm 401 fitted to a vertical support pillar 400 in a state vertically movable and rotatable through an angle of 90°. The forward end of the arm 401 is fitted with a holding plate 402, the lower end of which is provided with a block 404 having a pair of arms 403 set apart from each other. Each arm 403 has an outward curved front surface to constitute an abutting plane 405 (FIG. 80) for holding a pad spring 22. The paired arms 403 are provided with a pair of holding pins 406, each of which slidably penetrates the arm 403 in a horizontal direction to constitute a vertical holding section 407 facing the abutting plane 405. The underside of the holding plate 402 is fitted with an air cylinder 408. The forward end of a piston rod 409 of the air cylinder 408 is provided with a supporting member 410 for supporting the rear ends of the holding pins 406. The holding plate 402 further comprises another air cylinder 411, whose rod slidably penetrates the holding plate 402 and a projecting member 412 of the block 404 to be used as a pad spring-depressing rod 413. A pair of locating rods 414 extend downward from the foremost end of the holding plate 402 to be fitted into the locating holes 58 (FIG. 8) of the transport jig 32.

Figure 80:
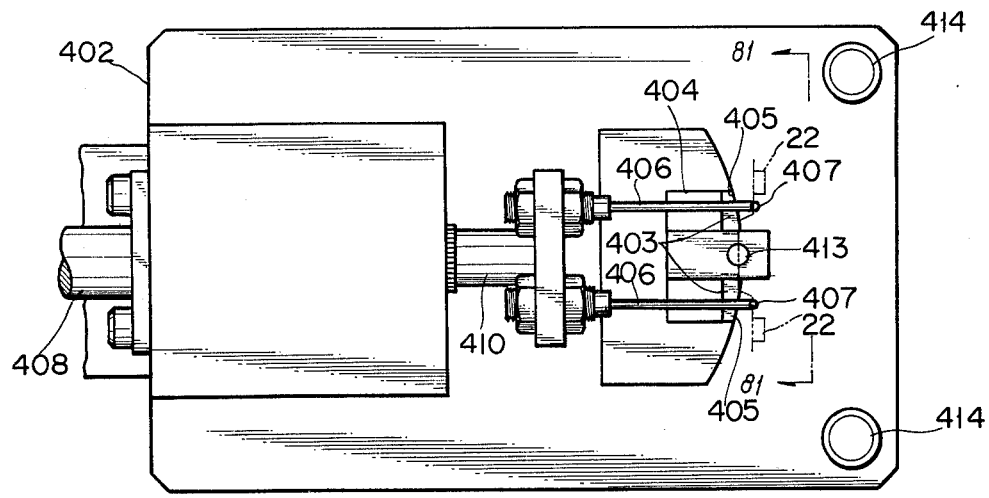
FIG. 80 is a bottom view of the pad spring-fitting means as taken from line 80—80 of FIG. 79.
Figure 81:
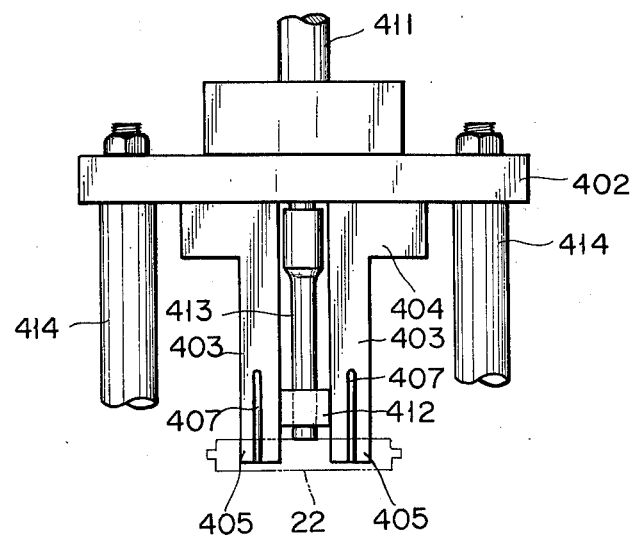
FIG. 81 is a side elevation of the pad spring-fitting means as viewed from line 81—81 of FIG. 80.

There will now be described the operation of the pad spring-loading device 371. Initially, the rotatable arm 401 occupies a chain line position shown in FIG. 78, namely, is disposed right above the pad spring waiting station 386 (FIG. 75). At this time, the holding pins 406 are positioned as shown in chain lines in FIG. 79. When the arm 401 is brought down by means (not shown), the lower ends of the pins 406 and arms 403 touch the upper surface of the table 388 of the pad spring waiting station 386. When the air cylinder 408 is operated, the pins 406 are retracted to the solid line position of FIG. 79 to clamp a pad spring between the holding sections 407 of said pins 406 and the abutting planes 405 of the arms 403. Since, at this time, the arms 22b of the pad spring 22 are aligned substantially straight, the pad spring 22 is held between the abutting planes 405 and holding sections 407 due to the elastic force of said spring 22 (FIG. 80). Thereafter the arm 401 is lifted and rotated through an angle of 90° by means (not shown) to bring the holding plate 402 right above the transport jig 32 placed on the conveyor device 31. When the arm 401 is brought down, the locating rods 414 are fitted into the locating holes 58 of the jig 32. The lower ends of the pins 406 and arms 403 very closely approach the bottom wall 3a (FIG. 1) of the lower cassette housing half 2a mounted on the jig 32. At this time, the pad spring 22 is brought between the spring seat projection 11 of the lower cassette housing half 2a and tape guide pins 13 (FIG. 1). When actuated by the air cylinder 411, the depression rod 413 transfers the pad spring 22 to the lower cassette housing half 2a. At this time, the rotatable arm 401 is lifted, causing the pad spring 22 to be set at a prescribed place in the lower cassette housing half 2a due to the elasticity of said spring 22. The air cylinder 403 is actuated to retract the pins 407 back to the chain line position of FIG. 79, and the rotatable arm 401 is turned through an angle of 90° ready for the succeeding cycle of operation.

After the pad spring 22 is loaded into the lower cassette housing half 2a, the transport jig 32 is carried forward by the conveyor device 31 in front of the upper lining sheet feeder 37 to be loaded with an upper lining sheet (FIG. 7). The upper lining sheet feeder 37 is of substantially the same type as the lower lining sheet feeder (FIGS. 30 to 32), description thereof being omitted.

After the upper lining sheet 26b is loaded into the lower cassette housing half 2a, the transport jig 32 is conducted to the upper cassette housing half feeder 38. Like the lower cassette housing half feeder 33, the upper cassette housing half feeder 38 comprises a sorting device 420 and loading device 421 of the upper cassette housing half feeder 38 (FIG. 7). The latter loading device 42 is of substantially the same type as the loading device 91 (FIGS. 24 to 29) of the lower cassette housing half feeder 33, description thereof being omitted.

The upper cassette housing half-sorting device 420 comprises, as shown in FIGS. 82 to 86, a barrel body 422 containing a large number of upper cassette housing halves 2b and a helical inclined passage 423, as in the case of the lower cassette housing half-sorting device 90 (FIGS. 19 to 23). The outer wall of the barrel body 422 is fitted with a receptacle 424, which is used to return an upper cassette housing half 2b falling off a guide rail 425 into the barrel body 422. That portion of the guide rail 425 which lies adjacent to an inclined passage 423 comprises a section 426 (FIG. 84) inclined side to side. This inclined section 426 allows the passage of the downward directed upper cassette housing half 2b in which the tape guide pins 14, 17b slidably abut against the inner edge wall of the guide rail 425. That portion of the guide rail 425 which lies beyond the inclined section 426 takes a horizontal position and thereafter is bent toward the barrel body 422. The outer wall of that portion of the guide rail 425 is fitted with a projecting edge 427. A first upper cassette housing half-sorting member 428 (FIG. 85) formed of a U-shaped wire is provided above the bent portion of the guide rail 425. The U-shaped sorting member 428 is positioned above the guide rail 425 in horizontal relationship thereto with the bottom portion of said U-shaped sorting member 428 so disposed as to face the barrel body 422. Said selecting member 428 is placed above the guide rail 425 at a level higher than the upper surface of the upright peripheral wall 15b (FIG. 1) of the upper cassette housing half 2b but lower than the upper ends of the tape guide pins 14, 17b. A second plate-like sorting member 429 is provided above that portion of the guide rail 425 which lies apart from the first sorting member 428 (FIG. 86). The second plate-like sorting member 429 is provided above the guide rail 425 on the inside thereof in horizontal relationship thereto, and comprises a downward projecting edge portion 430 extending all along said selecting member 429. The second plate-like sorting member 429 is disposed as much above the guide rail 425 as the first selecting member 428. That portion of the guide rail 425 which lies beyond the second plate-like sorting member 429 is enwrapped with a cover 431 (FIG. 82) made of transparent plastics material.

There will now be described the operation of the upper cassette housing half sorting device 420. A plurality of upper cassette housing halves 2b linearly moving up the inclined passage 423 of the barrel body 422 due to its shaking are successively brought to the inclined section 426 of the guide rail 425. The inclined section 426 allows the passage of a downward directed upper cassette housing half 2b in which the guide pins 14, 17b are positioned on the inner edge wall. However, an upper cassette housing half 2b which is turned upward, or in which the guide pins 14, 17b happens to abut against the upper surface of the guide rail 425 or in which the guide pins 14, 17b are positioned on the outer edge wall of the guide rail 425 is made to slip over the inclined section 426 into the receptacle 424. After passing over the inclined section 426, an upper cassette housing half 2b which happens to be upturned is thrown into the receptacle 424.

A normal upper cassette housing half 2b has one of its corners slidably pressed against the projecting edge 427 of the guide rail 425 near the curved section thereof. An upper cassette housing half 2b which has passed through the first sorting member 428 is carried to the second platelike sorting member 429, which detects any defective or undesirably positioned upper cassette housing half 2b and throws it into the barrel body 422.

As mentioned above, only a normal upper cassette housing half 2b passes through the respective selection or check points and is brought to a waiting station (not shown). The upper cassette housing half 2b placed on the waiting station is fitted on to the lower cassette housing half 2a placed on the transport jig 32 by the same loading device (not shown) as the loading device 91 of the lower cassette housing half feeder 33.

A transport jig loaded with a normal upper cassette housing half 2b is carried to the screw-fitting device 39 by the conveyor 31 to be screwed into place and thereafter brought to the screw-examining device 40 (FIG. 7). Both screw-fitting device 39 and screw-examining device 40 are of the known type, detailed description being omitted.

Finally, the jig 32 loaded with a fully assembled tape cassette 1 is carried to the tape cassette-removing device 41, which transfers a finished tape cassette 1 from the transport jig 32 to the discharging conveyor 42. The conveyor 31 then conducts a jig 32 now emptied to the lower cassette housing half feeder 33.

The foregoing embodiment refers to a tape cassette 1 having guide rollers 20. However, some tape cassettes are not provided with guide rollers 20, but conduct a magnetic tape directly by a support shaft 12. With such tape cassette, it is advised to apply a tape cassette-assembling system not equipped with a mechanism associated with the guide rollers 20.

I claim:

1. A system for automatically assembling a magnetic tape cassette including first and second cassette housing halves, a pair of reel hubs received in the cassette housing halves and a magnetic tape wound about both reel hubs, which comprises at least one magnetic tape loading device for winding a magnetic tape about the reel hubs and loading the reel hubs and magnetic tape into the first cassette housing half, wherein the magnetic tape-loading device includes at least one magnetic tape takeup jig; a reel hub-fitting device for setting the reel hubs onto the jig; a magnetic tape takeup device for winding a prescribed amount of magnetic tape about the reel hubs placed on the jig; and a magnetic tape-transferring device adapted to hold the reel hubs mounted on the magnetic tape takeup jig and magnetic tape in substantially the same position as that in which both reel hubs and magnetic tape are to be finally received in the magnetic tape cassette and thereafter to transfer both reel hubs and magnetic tape into the first cassette housing half from the jig.

2. The automatic magnetic tape cassette-assembling system according to claim 1, wherein the magnetic tapetransferring device comprises reel hub-holding means for receiving reel hubs together with a magnetic tape from the magnetic tape takeup jig; and magnetic tapesupporting means engageable with a magnetic tape to hold it in substantially the same position as that which is assumed by the magnetic tape when it detours through the magnetic tape cassette.

3. The automatic magnetic tape cassette-assembling system according to claim 2, wherein the magnetic tape-transferring device further comprises tension-applying means for applying tension to a magnetic tape held by the reel bubs and magnetic tape-supporting means, thereby preventing the magnetic tape from being loosely stretched.

4. The automatic magnetic tape cassette-assembling system according to claim 2, wherein the magnetic tape-transferring device further comprises reel hub-releasing means for forcefully releasing the reel hubs and setting them onto the first cassette housing half.

5. The automatic magnetic tape cassette-assembling system according to claim 1, wherein the reel hubs are held by a pair of bars and a pair of reel hub-supporting members fitted to the lower ends of the bars for engagement with the reel hubs; and the reel hub-releasing means comprises a pair of sleeves mounted on the bars in a state movable axially of said bars, thereby forcing the reel hubs downward from the reel hub-supporting member.

6. The automatic magnetic tape cassette-assembling system according to claim 5, wherein the magnetic tape-transferring device further comprises tension-supplying means for driving at least one of the paired bars to rotate the reel hub held by said bar in a direction in which the magnetic tape is tightly stretched.

7. The automatic magnetic tape cassette-assembling system according to claim 1, wherein the magnetic tape take-up jig comprises a body; a pair of reel hub-supporting shafts fitted to the body in a state vertically movable but incapable of being rotated and each provided with a reel hub-supporting section at the upper end; urging means for upward urging the supporting shafts to cause the reel hub-supporting sections to project above the upper surface of the jig body; a key fitted to one of the reel hub-supporting shafts in a vertically movable state, thereby preventing the rotation of a reel hub mounted on said one reel hub-supporting shaft; locking means for locking the key below the upper surface of the jig body when the key is brought down; and releasing means for releasing the lock means to return the key to its initial position.

8. The automatic magnetic tape cassette-assembling system according to claim 7, wherein the magnetic tape takeup device comprises reel hub-driving means for rotating a reel hub supported on said one reel hub-supporting shaft to wind a prescribed amount of magnetic tape about the reel hub.

9. The automatic magnetic tape cassette-assembling system according to claim 8, wherein the reel hub driving means comprises a supporting arm; a rod fitted to the arm in a state vertically movable and rotatable; and a reel hub-driving member fitted to the lower end of the rod to force down said one reel hub supporting shaft together with the key when the rod is brought down for engagement with the reel hub.

10. The automatic magnetic tape cassette-assembling system according to claim 1, wherein the magnetic tape takeup device comprises a reel for holding a large amount of magnetic tape; a magnetic tape guide device for guiding the magnetic tape from the reel to the proximity of the magnetic tape takeup jig; a magnetic tape-conducting device for holding the forward end of a magnetic tape and causing the magnetic tape to detour about the reel hubs placed on the magnetic tape takeup jig; a first magnetic tape takeup device for fitting the forward end portion of the magnetic tape to one of the reel hubs; a reel hub-driving device for operating said one reel hub to wind a prescribed amount of magnetic tape about said one reel hub; a second magnetic tape takeup device for fitting the rear end portion of the prescribed amount of magnetic tape to the other reel hub; and a first magnetic tape-cutting device for cutting off the excess end portion of the magnetic tape stretched across the magnetic tape-fitting section of said other reel hub and the magnetic tape guide device.

11. The automatic magnetic tape cassette-assembling system according to claim 10, wherein the magnetic tape takeup device further comprises a second magnetic tape-cutting device for cutting off the excess end portion stretched across the magnetic tape conducting device and the magnetic tape-fitting section of said one reel hub.

12. The automatic magnetic tape cassette-assembling system according to claim 10, wherein the magnetic tape guide device comprises clamping means for catching the magnetic tape before its excess end portion is cut off and applying tight tension to that portion of the magnetic tape which is stretched between the magnetic tape takeup section of said other reel hub and the clamping means.

13. The automatic magnetic tape cassette-assembling system according to claim 1, wherein the magnetic tape cassette further comprises a pair of guide rollers for keeping a magnetic tape in prescribed detouring condition; and the magnetic tape takeup jig comprises a pair of reel shafts and a pair of roller shafts for supporting the reel hubs and guide rollers in substantially the same position as that which said reel hubs and guide rollers later assume in the magnetic tape cassette.

14. The automatic magnetic tape cassette-assembling system according to claim 13, wherein the magnetic tape-transferring device comprises reel-supporting means for receiving the reel hubs wound with the magnetic tape from the reel-supporting shafts of the magnetic tape takeup jig; roller-supporting means for receiving the guide rollers from the roller-supporting shafts of the magnetic tape takeup jig; and magnetic tape-supporting means engageable with the magnetic tape to keep it in substantially the same detouring state as that which the magnetic tape presents in the magnetic tape cassette.

15. The automatic magnetic tape cassette-assembling system according to claim 14, wherein the magnetic tape-transferring device further comprises tension-applying means for applying tight tension to the magnetic tape held by the reel-supporting means, roller-supporting means and magnetic tape supporting means to prevent it from being loosely stretched.

16. The automatic magnetic tape cassette-assembling system according to claim 14, wherein the magnetic tape-transferring device further comprises reel hub-removing means for forcefully taking off the reel hubs from the reel hub-supporting means; and roller-removing means for forcefully taking off the guide rollers from the roller-supporting means.

17. The automatic magnetic tape cassette-assembling system according to claim 13, wherein the magnetic tape loading device further comprises guide roller-fitting means for fitting guide rollers to the roller-supporting shafts of the magnetic tape takeup jig.

18. The automatic magnetic tape cassette-assembling system according to claim 17, wherein the magnetic tape-loading device further comprises a turn table for conducting the magnetic tape takeup jig to the roller-fitting means, reel hub-fitting device, magnetic tape takeup device and magnetic tape transferring device in turn.

19. The automatic magnetic tape cassette-assembling system according to claim 1, which further comprises conveyor means; and at least one transport jig supported on the conveyor means to conduct a magnetic tape cassette being assembled to the prescribed positions on the assembly line.

20. The automatic magnetic tape cassette-assembling system according to claim 19, which further comprises a first cassette housing half feeder for mounting the first cassette housing half on the transport jig, thereby enabling the magnetic tape-transferring device to transpose the reel hubs and magnetic tape from the magnetic tape takeup device to the first cassette housing half placed on the transport jig.

21. The automatic magnetic tape cassette-assembling system according to claim 20, wherein the first cassette housing half feeder comprises a cassette housing half-sorting device for selecting a first cassette housing half assuming prescribed shape and posture; and cassette-housing half-loading device for transferring the normal cassette housing half from the cassette housing half-sorting device to the transport jig.

22. The automatic magnetic tape cassette-assembling system according to claim 20, which further comprises a second cassette housing half feeder for fitting the second cassette housing half to the first cassette housing half loaded with reel hubs and magnetic tape.

23. The automatic magnetic tape cassette-assembling system according to claim 22, wherein the second cassette housing half feeder comprises cassette housing half-sorting means for selecting a second cassette housing half assuming prescribed shape and posture; and cassette housing half-loading means for transferring the normal second cassette housing half from the sorting means thereof to the first cassette housing half mounted on the transport jig.

24. The automatic magnetic tape cassette-assembling system according to claim 19, wherein the magnetic tape cassette further comprises a pair of lining sheets; and the assembling system itself comprises a first lining sheet-loading device for fitting one of the lining sheets into the first cassette housing half mounted on the transport jig before reel hubs and magnetic tape are fitted into said first cassette housing half, and a second lining sheet-loading device for fitting the other lining sheet into the first cassette housing half after the reel hubs and magnetic tape are loaded thereinto.

25. The automatic magnetic tape cassette-assembling system according to claim 19, wherein the magnetic tape cassette further comprises a pad spring; and the assembling system itself further comprises pad spring-fitting means for loading pad spring into the first cassette housing half placed on the transport jig.

26. The automatic magnetic tape cassette-assembling system according to claim 25, wherein the pad spring-fitting means comprises pad spring-sorting means for selecting a pad spring assuming prescribed shape and posture; and pad spring-loading means for keeping the normal pad spring in substantially the same position as that which said normal pad spring takes in the magnetic tape cassette and thereafter fitting the pad spring into the first cassette housing half.

27. The automatic magnetic tape cassette-assembling system according to claim 19, wherein the conveyor means comprises stop mechanism for bringing the transport jig to rest at the prescribed position.

28. The automatic magnetic tape cassette-assembling system according to claim 27, wherein the stop mechanism comprises a first inclined wall provided on the conveyor means; an engagement wall formed at the upper end of the first inclined wall; a second inclined wall formed on the transport jig in a state slidable over the first inclined wall; and pressing means for pressing the transport jig horizontally to cause the first inclined wall to slide upward over the second inclined wall, thereby securely setting the transport jig in place through cooperation of the first inclined wall, engagement wall and second inclined wall.

29. The automatic magnetic tape cassette-assembling system according to claim 27, wherein the stop mechanism further comprises lifting means for lifting the transport jig off the conveyor means.

30. The automatic magnetic tape cassette-assembling system according to claim 19, wherein the transport jig comprises a body; a pair of reel hub-supporting shafts rotatably fitted to the body; gear means for connecting both reel hub-supporting shafts together; a movable rack engaged with the gear means; and spring means for urging the rack only in one direction, and the conveyor means comprises pressing means for urging the rack in the opposite direction against the force of the spring means; and actuating means for operating the pressing means to cause the reel hubs on the reel hub-supporting shafts to rotate for the loosening of a stretched magnetic tape, whereby when the actuating means is brought into an inoperative condition, the spring means urges the rack to cause the reel hubs on the reel hub-supporting shafts to rotate for the tight tension of the stretched magnetic tape.

* * * * *